[12] United States Patent
Morvillo

(10) Patent No.: US 9,481,441 B2
(45) Date of Patent: Nov. 1, 2016

(54) VARIABLE TRIM DEFLECTOR SYSTEM AND METHOD FOR CONTROLLING A MARINE VESSEL

(71) Applicant: Robert A. Morvillo, Dover, MA (US)

(72) Inventor: Robert A. Morvillo, Dover, MA (US)

(*) Notice: Subject to any disclaimer, the term of this patent is extended or adjusted under 35 U.S.C. 154(b) by 235 days.

(21) Appl. No.: 14/092,063

(22) Filed: Nov. 27, 2013

(65) Prior Publication Data

US 2014/0209007 A1    Jul. 31, 2014

Related U.S. Application Data

(63) Continuation of application No. 13/031,171, filed on Feb. 18, 2011, now Pat. No. 8,631,753.

(60) Provisional application No. 61/305,778, filed on Feb. 18, 2010.

(51) Int. Cl.
*B63B 39/06* (2006.01)
*B63H 25/44* (2006.01)
*B63H 25/46* (2006.01)
*B63B 1/32* (2006.01)

(52) U.S. Cl.
CPC ............... *B63H 25/44* (2013.01); *B63B 1/32* (2013.01); *B63B 39/061* (2013.01); *B63H 25/46* (2013.01)

(58) Field of Classification Search
CPC ... B63B 39/06; B63B 39/061; B63B 39/062; B63B 2039/063; B63B 2039/065; B63B 2039/068; B63B 1/32; B63H 25/44; B63H 25/46

USPC ............ 114/144 R, 145 R, 145 A, 284–287; 440/40–43
See application file for complete search history.

(56) References Cited

U.S. PATENT DOCUMENTS

| 1,257,298 A | * | 2/1918 | Westendarp | ........... B63H 25/44 |
| | | | | 114/145 R |
| 1,641,567 A | | 9/1927 | Barling | |
| 3,200,782 A | | 8/1965 | Walden et al. | |
| 3,258,916 A | | 7/1966 | Lehmann | |
| 3,577,948 A | | 5/1971 | Frey | |

(Continued)

FOREIGN PATENT DOCUMENTS

| CH | WO 2008095323 A1 | * | 8/2008 | ............. B63B 39/06 |
| CH | WO 2009097706 A2 | * | 8/2009 | ............. B63B 23/32 |

(Continued)

OTHER PUBLICATIONS

Office Communication dated Mar. 7, 2014 for European Application No. 11751971.0.

(Continued)

*Primary Examiner* — Ajay Vasudeva
(74) *Attorney, Agent, or Firm* — Wolf, Greenfield & Sacks, P.C.

(57) ABSTRACT

A method and a system for controlling a marine vessel having first and second trim deflectors is disclosed. The first and second trim deflectors have a first surface having a first area and a second surface having a second area, wherein the second planar surface is coupled to the first surface. The method and system control the first and second trim deflectors to induce any of a net yawing force, a net rolling force, and a net trimming force to the marine vessel without inducing any other substantial forces to the marine vessel by controlling the first and second trim deflectors.

1 Claim, 24 Drawing Sheets

(56) References Cited

U.S. PATENT DOCUMENTS

| | | |
|---|---|---|
| 3,604,383 A | 9/1971 | Ingelman-Sundberg |
| 3,756,185 A | 9/1973 | Breslin |
| 4,327,657 A | 5/1982 | Knoos |
| 4,538,997 A | 9/1985 | Haglund |
| 4,644,893 A | 2/1987 | Zepp |
| 4,691,659 A | 9/1987 | Ito et al. |
| 4,747,359 A | 5/1988 | Ueno |
| 4,762,079 A | 8/1988 | Takeuchi et al. |
| 4,893,828 A | 1/1990 | Godbersen |
| 4,967,682 A | 11/1990 | O'Donnell |
| 4,992,065 A | 2/1991 | Torneman et al. |
| 5,031,561 A | 7/1991 | Nilsson |
| 5,085,603 A | 2/1992 | Haluzak |
| 5,145,426 A | 9/1992 | Kobayashi et al. |
| 5,203,728 A | 4/1993 | Kobayashi |
| 5,263,432 A | 11/1993 | Davis |
| 5,385,110 A | 1/1995 | Bennett et al. |
| 5,421,753 A | 6/1995 | Roos |
| 5,474,012 A | 12/1995 | Yamada et al. |
| 5,524,567 A | 6/1996 | Astley et al. |
| 5,579,711 A | 12/1996 | Thomas |
| 5,605,480 A | 2/1997 | Wright |
| 5,664,978 A | 9/1997 | Howe |
| 5,713,770 A | 2/1998 | Ambli |
| 6,089,177 A | 7/2000 | Muller |
| 6,095,077 A | 8/2000 | DeAgro |
| 6,193,571 B1 | 2/2001 | Burg |
| 6,230,642 B1 | 5/2001 | McKenney et al. |
| 6,234,100 B1 | 5/2001 | Fadeley et al. |
| 6,234,853 B1 | 5/2001 | Lanyi et al. |
| 6,238,257 B1 | 5/2001 | Platzer et al. |
| 6,273,771 B1 | 8/2001 | Buckley et al. |
| 6,308,651 B2 | 10/2001 | McKenney et al. |
| 6,363,875 B1 | 4/2002 | Griffith et al. |
| 6,386,930 B2 | 5/2002 | Moffet |
| 6,401,644 B2 | 6/2002 | Fadeley et al. |
| 6,447,349 B1 | 9/2002 | Fadeley et al. |
| 6,453,835 B2 | 9/2002 | Fadeley et al. |
| 6,520,104 B1 | 2/2003 | Svensson |
| 6,524,146 B2 | 2/2003 | Spade et al. |
| 6,604,479 B2 | 8/2003 | McKenney et al. |
| 6,652,333 B1 | 11/2003 | Adomeit |
| 6,823,812 B2 | 11/2004 | Von Wolske |
| 6,865,996 B2 | 3/2005 | Borrett |
| 6,923,136 B1 | 8/2005 | D'Alessandro |
| 7,004,097 B2 | 2/2006 | Zeromski |
| 7,036,445 B2 | 5/2006 | Kaufmann et al. |
| 7,037,150 B2 | 5/2006 | Morvillo |
| 7,052,338 B2 | 5/2006 | Morvillo |
| 7,131,386 B1 | 11/2006 | Caldwell |
| 7,143,363 B1 | 11/2006 | Gaynor et al. |
| 7,168,996 B2 | 1/2007 | Morvillo |
| 7,311,058 B1 | 12/2007 | Brooks et al. |
| 7,311,059 B2 | 12/2007 | Loui et al. |
| 7,443,078 B1 | 10/2008 | DuBrucq |
| 7,448,780 B2 | 11/2008 | Hurley |
| 7,500,890 B2 | 3/2009 | Morvillo |
| 7,533,624 B2 | 5/2009 | Mizutani |
| 7,631,610 B1 | 12/2009 | Wolske |
| 7,641,525 B2 | 1/2010 | Morvillo |
| 7,707,956 B2 * | 5/2010 | Moore ............... B63B 39/061 114/284 |
| 8,387,551 B2 * | 3/2013 | Muller .............. B63B 39/061 114/285 |
| 8,434,420 B2 * | 5/2013 | Muller ............... B63B 23/32 114/259 |
| 8,631,753 B2 * | 1/2014 | Morvillo ........... B63B 39/061 114/285 |
| 2001/0029134 A1 | 10/2001 | Moffet |
| 2003/0054707 A1 | 3/2003 | Morvillo |
| 2003/0077954 A1 | 4/2003 | Fadeley et al. |
| 2003/0079668 A1 | 5/2003 | Morvillo |
| 2005/0042951 A1 | 2/2005 | Morvillo |
| 2006/0121803 A1 | 6/2006 | Morvillo |
| 2006/0148342 A1 | 7/2006 | Morvillo |
| 2009/0101057 A1 * | 4/2009 | Mueller ............ B63H 21/213 114/286 |
| 2010/0101475 A1 | 4/2010 | Mueller |
| 2011/0320072 A1 | 12/2011 | Morvillo |

FOREIGN PATENT DOCUMENTS

| | | |
|---|---|---|
| DE | 4033674 | 7/1991 |
| EP | 0035859 A2 | 9/1981 |
| EP | 0035859 A3 | 9/1981 |
| EP | 0518229 A1 | 12/1992 |
| EP | 0778196 | 6/1997 |
| EP | 0794115 A1 | 9/1997 |
| JP | 07-237576 A | 9/1995 |
| WO | WO 96/20105 | 7/1996 |
| WO | WO 01/34463 A2 | 5/2001 |
| WO | WO 03/026955 | 4/2003 |
| WO | WO 2005/009839 | 2/2005 |
| WO | WO 2005/080190 A1 | 9/2005 |
| WO | WO 2006/058232 A | 6/2006 |
| WO | WO 2008/095323 A1 | 8/2008 |
| WO | WO 2008/106807 A1 | 9/2008 |

OTHER PUBLICATIONS

International Preliminary Report on Patentability mailed Aug. 30, 2012 for PCT/US2011/025564.
PCT International Search Report PCT/US2005/042776 dated Apr. 6, 2006.
Servo Comander Dual Drive Brochure, SKT/Styr-Kontroll Teknik AB; BN Marin Elektronik, Sweden (1996).
Bird-Johnson/PDI Brochure.
Printout from Ultradynamics Web Page, May 13, 2002.
Rolls-Royce A-Series Instruction Manual Kamewa Water Jets, Jun. 26, 2000, pp. 15-54.
"Remote Manoevre Controller—Dual Drive and Quadruple Drive Captain's Instruction," Sty-Kontroll Teknik AB, Stockholm, Sweden, Jul. 1994.
PCT International Search Report PCT/US02/30928 dated Apr. 29, 2003.
PCT International Search Report PCT/US2004/022838 dated Nov. 24, 2004.
PCT International Search Report PCT/US2006/046518 dated Apr. 24, 2007.
SKT Brochure, 1991.

* cited by examiner

Rib with Waterjets and Trim-Tabs

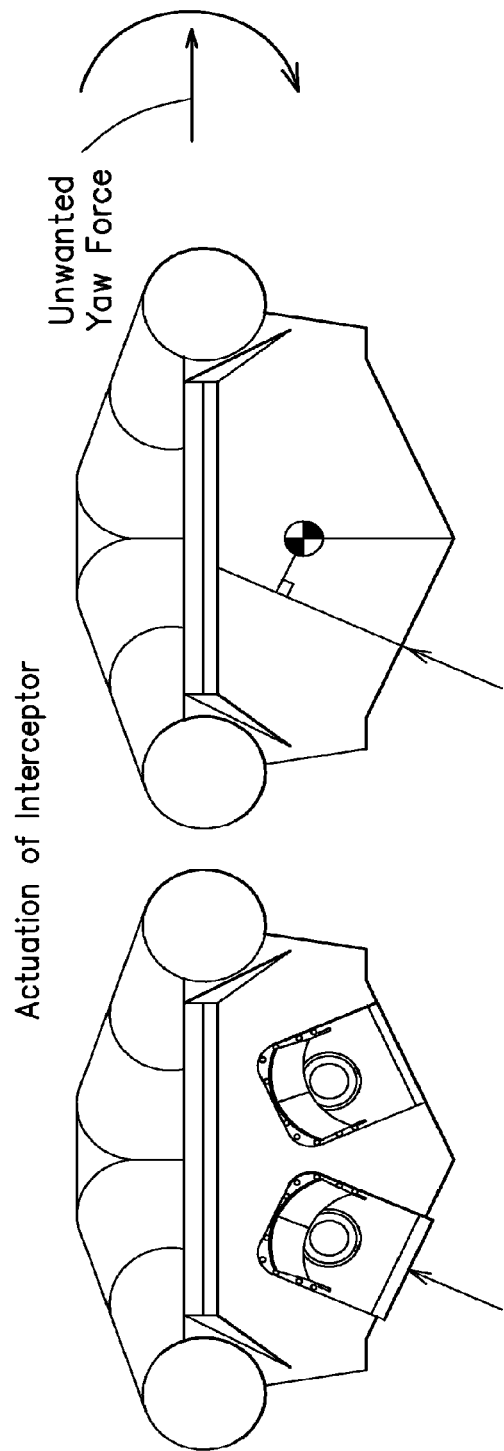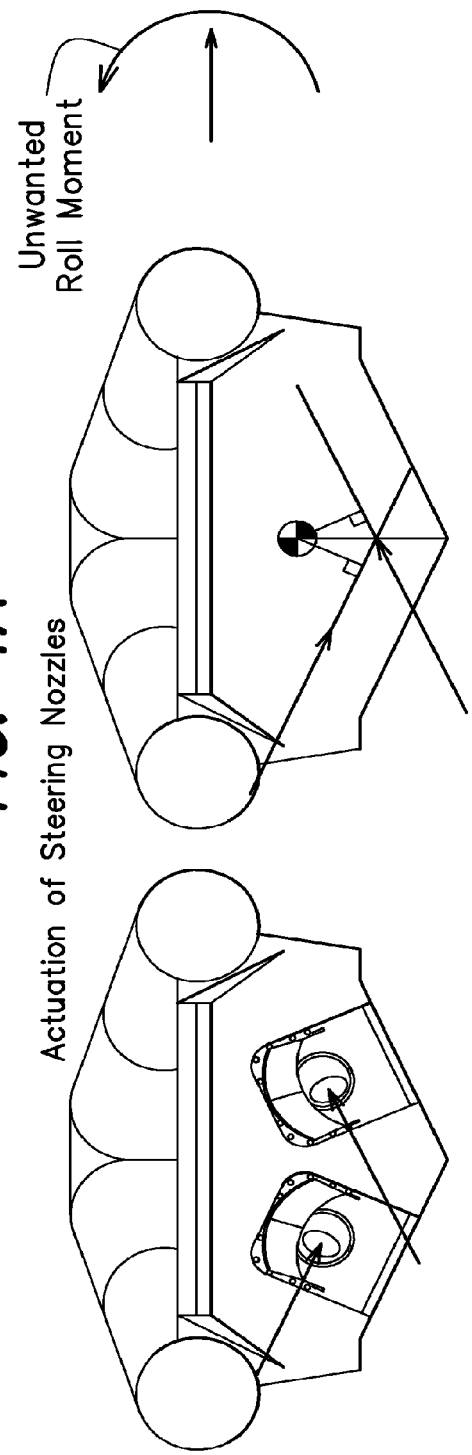

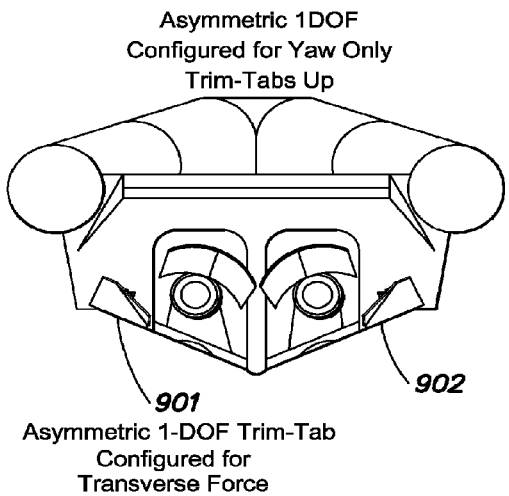

Asymmetric 1DOF
Configured for Yaw Only
Trim-Tabs Up 901
902
Asymmetric 1-DOF Trim-Tab
Configured for
Transverse Force

FIG. 9A

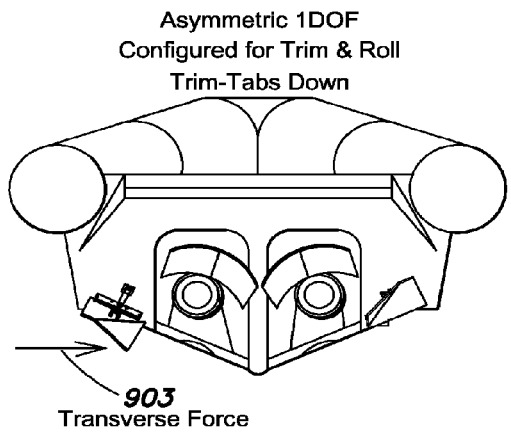

Asymmetric 1DOF
Configured for Trim & Roll
Trim-Tabs Down

903
Transverse Force

FIG. 9B

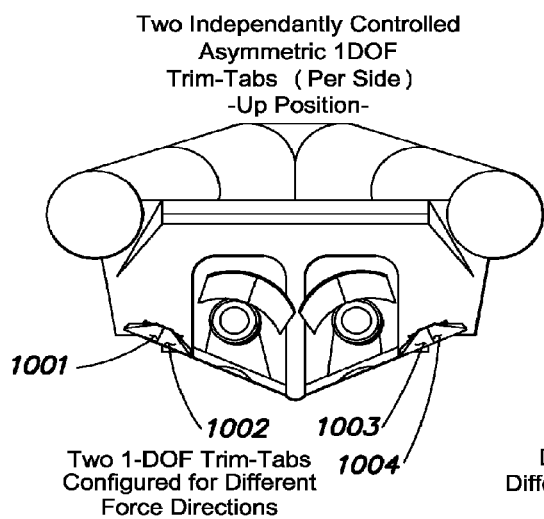

Two Independantly Controlled
Asymmetric 1DOF
Trim-Tabs (Per Side)
-Up Position- 1001
1002  1003
Two 1-DOF Trim-Tabs  1004
Configured for Different
Force Directions

FIG. 10A

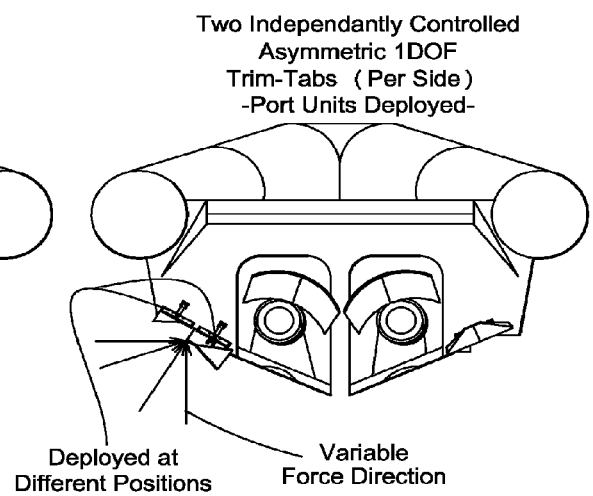

Two Independantly Controlled
Asymmetric 1DOF
Trim-Tabs (Per Side)
-Port Units Deployed- Deployed at      Variable
Different Positions   Force Direction

FIG. 10B

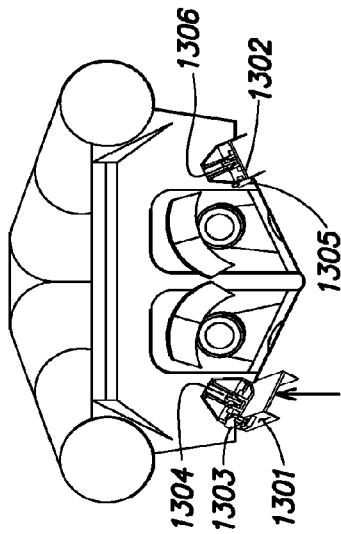
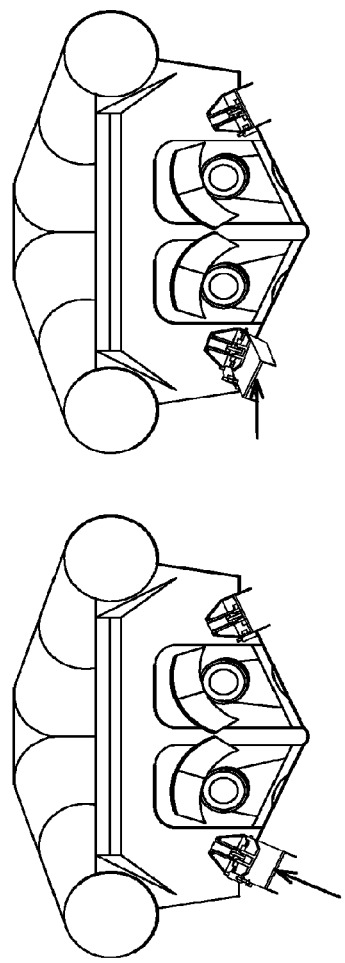
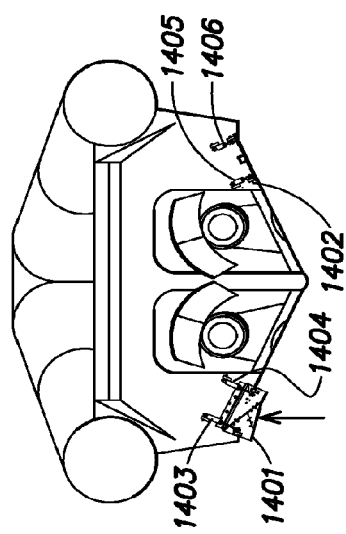
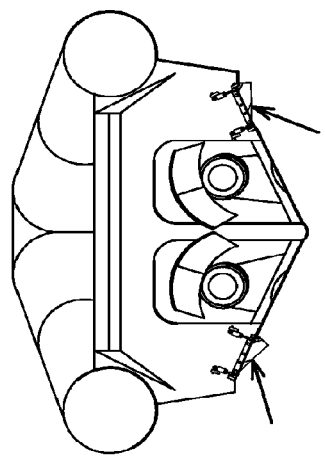

Articulating 2-DOF Trim-Tab

Folding 2-DOF Trim-Tab

2 DOF Trim-Tab Folding Configuration
Retracted

Deployed (Compound Actuation)

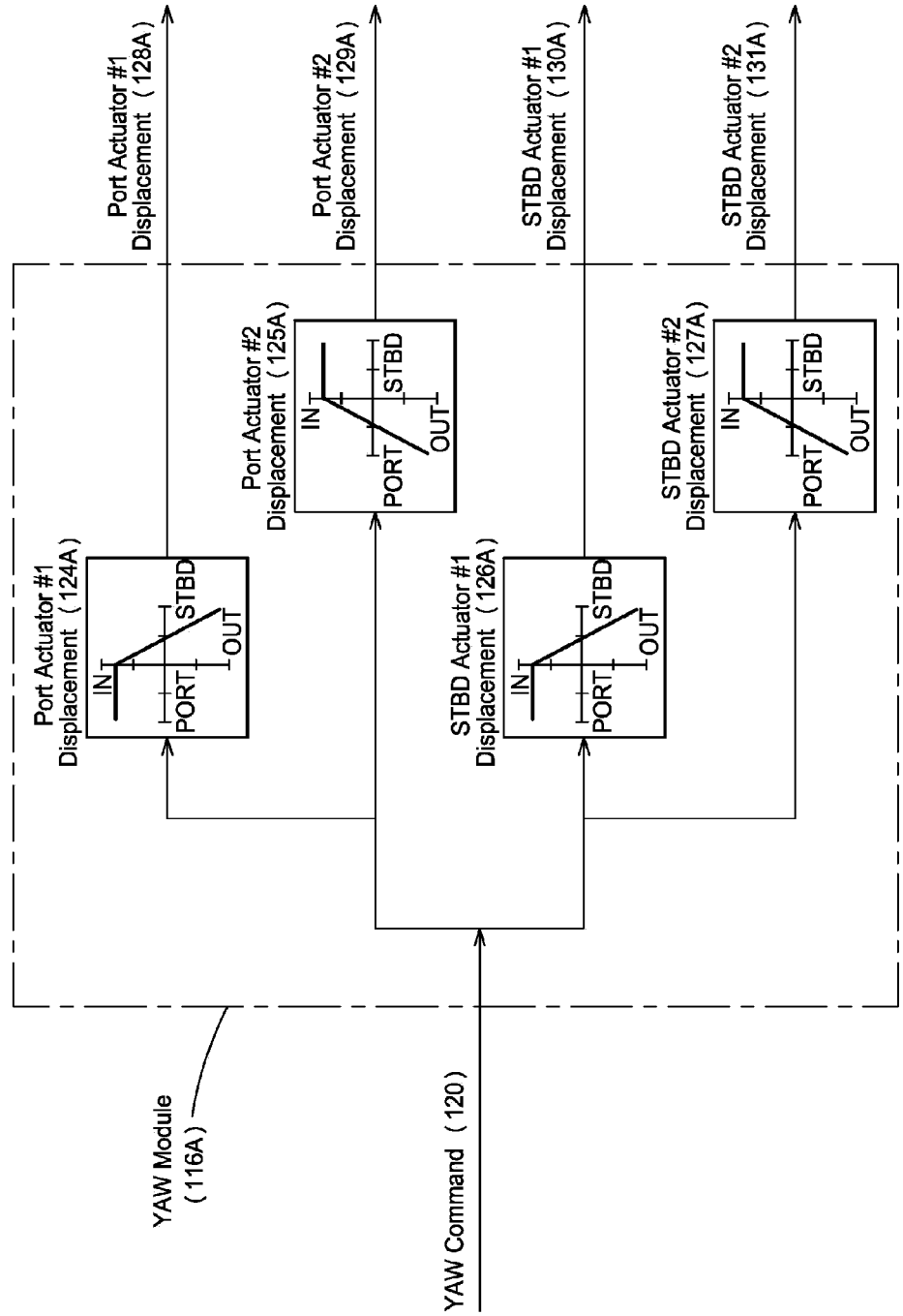

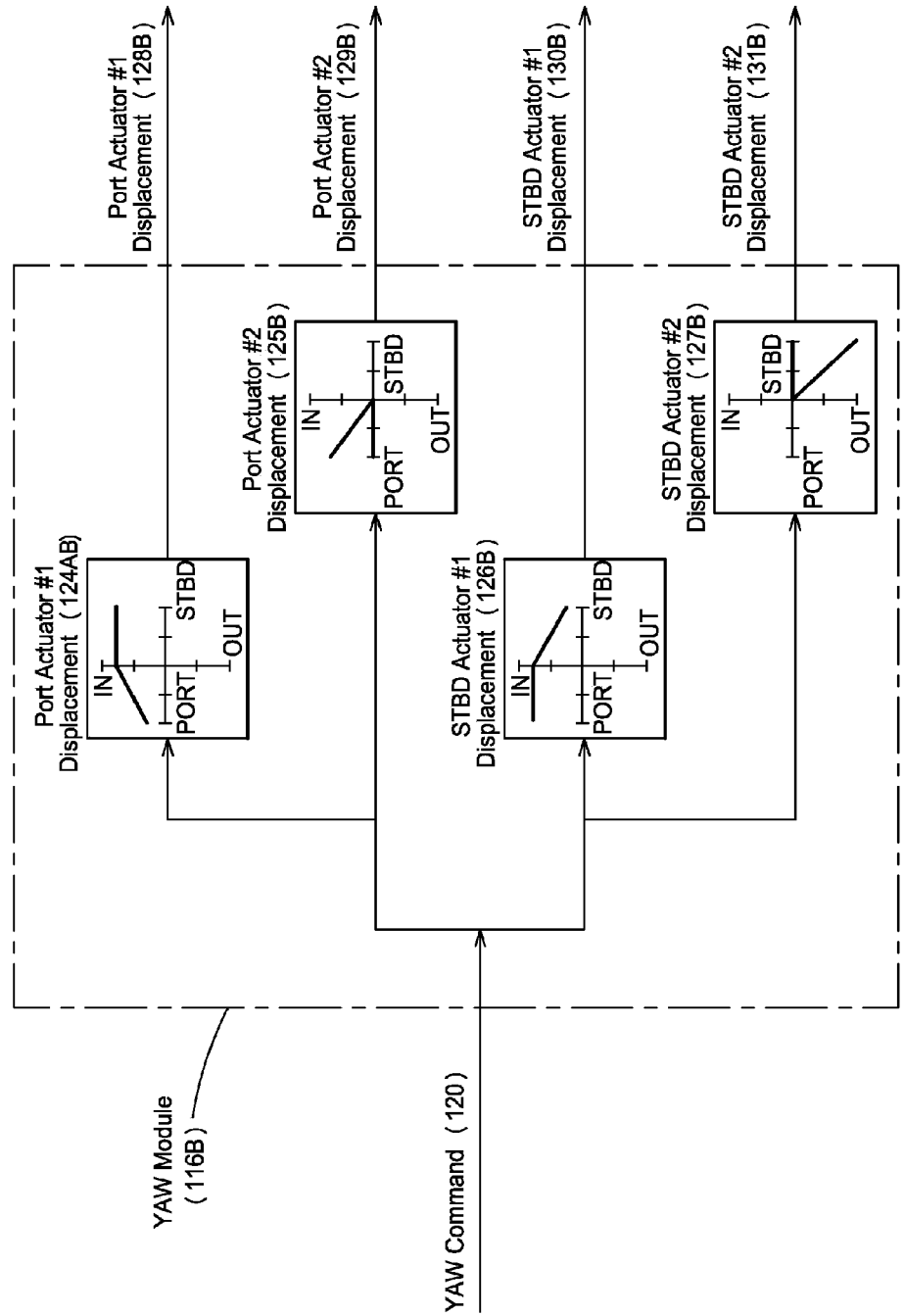

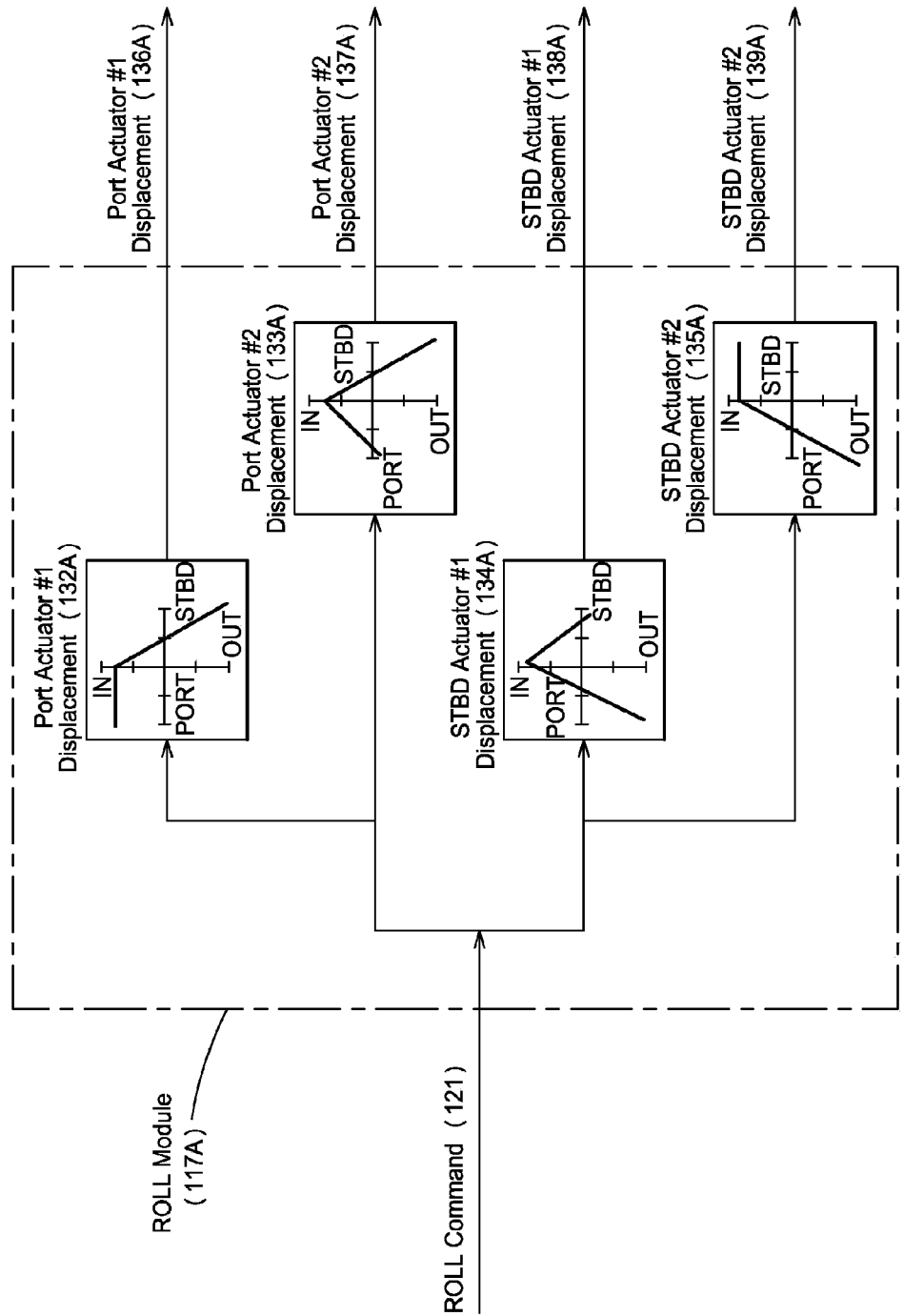

ROLL Module
Articulating Trim-Tab

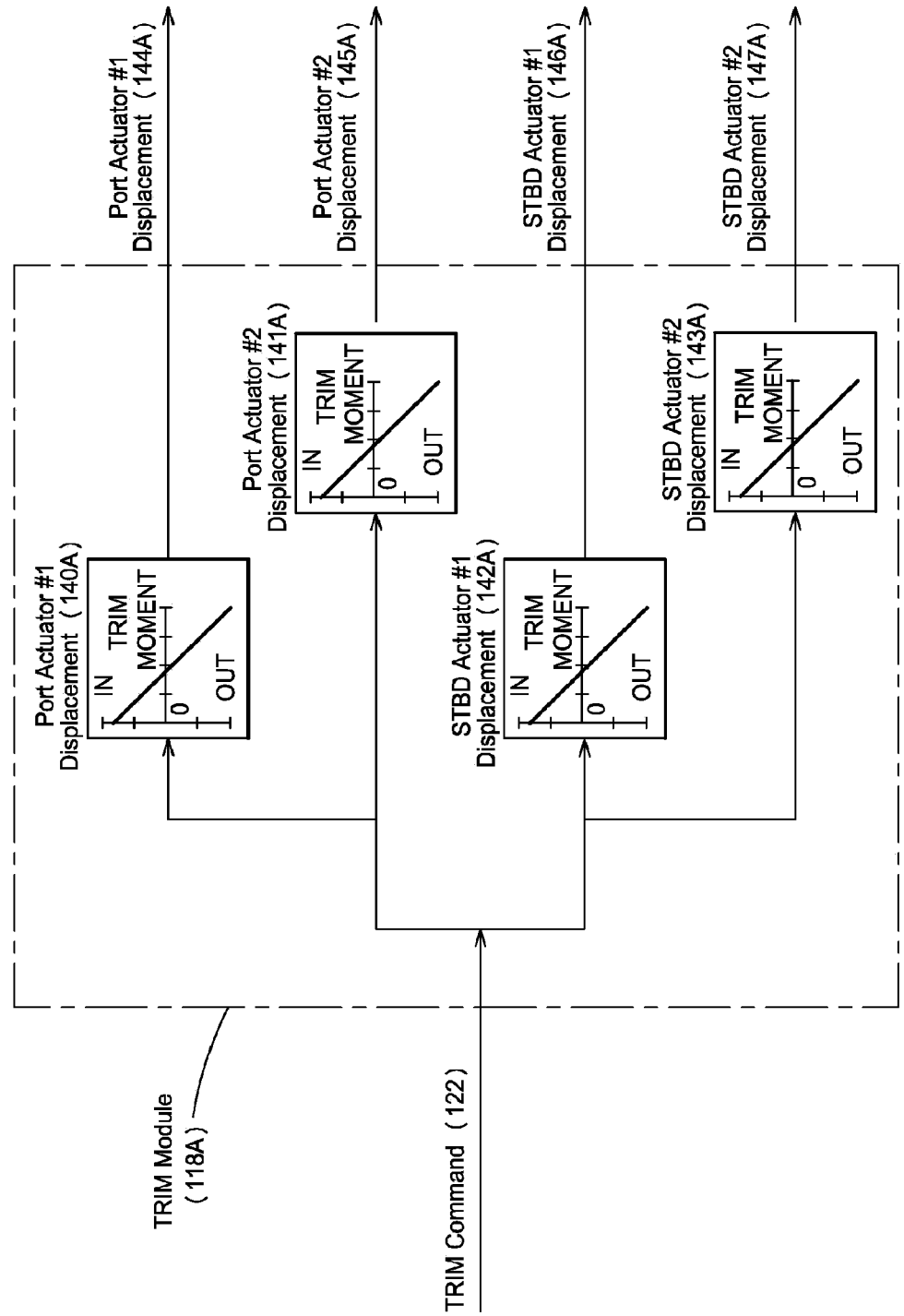

TRIM Module
Articulating Trim Tab

VARIABLE TRIM DEFLECTOR SYSTEM AND METHOD FOR CONTROLLING A MARINE VESSEL

CROSS-REFERENCE TO RELATED APPLICATIONS

The present application claims the benefit under 35 U.S.C. §120 and is a continuation of U.S. application Ser. No. 13/031,171, titled "VARIABLE TRIM DEFLECTOR SYSTEM AND METHOD FOR CONTROLLING A MARINE VESSEL," filed Feb. 18, 2011, which claims the benefit under 35 U.S.C. §119(e) of U.S. Provisional Application Ser. No. 61/305,778 filed on Feb. 18, 2010, titled, "ASYMMETRIC 1DOF AND VARIABLE GEOMETRY 2DOF TRIM-TABS," each of which is hereby incorporated by reference in its entirety.

FIELD OF THE INVENTION

The present invention relates to marine vessel propulsion and control systems. More particularly, aspects of the invention relate to control devices and methods for controlling the movement of a marine vessel having waterjet propulsion apparatus and trim deflectors.

DESCRIPTION OF THE RELATED ART

Marine vessels have a wide variety uses for transportation of people and cargo across bodies of water. These uses include fishing, military and recreational activities. Marine vessels may move on the water surface as surface ships do, as well as move beneath the water surface, as submarines do. Some marine vessels use propulsion and control systems.

Various forms of propulsion have been used to propel marine vessels over or through the water. One type of propulsion system comprises a prime mover, such as an engine or a turbine, which converts energy into a rotation that is transferred to one or more propellers having blades in contact with the surrounding water. The rotational energy in a propeller is transferred by contoured surfaces of the propeller blades into a force or "thrust" which propels the marine vessel. As the propeller blades push water in one direction, thrust and vessel motion are generated in the opposite direction. Many shapes and geometries for propeller-type propulsion systems are known.

Other marine vessel propulsion systems utilize water jet propulsion to achieve similar results. Such devices include a pump, a water intake or suction port and an exit or discharge port, which generate a water jet stream that propels the marine vessel. The water jet stream may be deflected using a "deflector" to provide marine vessel control by redirecting some water jet stream thrust in a suitable direction and in a suitable amount.

It is sometimes more convenient and efficient to construct a marine vessel propulsion system such that the net thrust generated by the propulsion system is always in the forward direction. The "forward" direction or "ahead" direction is along a vector pointing from the stern, or aft end of the vessel, to its bow, or front end of the vessel. By contrast, the "reverse", "astern" or "backing" directing is along a vector pointing in the opposite direction (or 180° away) from the forward direction. The axis defined by a straight line connecting a vessel's bow to its stern is referred to herein as the "major axis" of the vessel. A vessel has only one major axis. Any axis perpendicular to the major axis is referred to herein as a "minor axis." A vessel has a plurality of minor axes, lying in a plane perpendicular to the major axis. Some marine vessels have propulsion systems which primarily provide thrust only along the vessel's major axis, in the forward or backward directions. Other thrust directions, along the minor axes, are generated with awkward or inefficient auxiliary control surfaces, rudders, planes, deflectors, etc. Rather than reversing the direction of a ship's propeller or water jet streams, it may be advantageous to have the propulsion system remain engaged in the forward direction while providing other mechanisms for redirecting the water flow to provide the desired maneuvers.

A requirement for safe and useful operation of marine vessels is the ability to steer the vessel from side to side. Some systems, commonly used with propeller-driven vessels, employ "rudders" for this purpose. A rudder is generally a planar water deflector or control surface, placed vertically into the water, and parallel to a direction of motion, such that left-to-right deflection of the rudder, and a corresponding deflection of a flow of water over the rudder, provides steering for the marine vessel.

Other systems for steering marine vessels, commonly used in water jet stream propelled vessels, rotate the exit or discharge nozzle of the water jet stream from one side to another. Such a nozzle is sometimes referred to as a "steering nozzle." Hydraulic actuators may be used to rotate an articulated steering nozzle so that the aft end of the marine vessel experiences a sideways thrust in addition to any forward or backing force of the water jet stream. The reaction of the marine vessel to the side-to-side movement of the steering nozzle will be in accordance with the laws of motion and conservation of momentum principles, and will depend on the dynamics of the marine vessel design.

A primary reason why waterjet powered craft are extremely efficient at high speeds is the lack of appendages located bellow the waterline. Typical appendages that can be found on non-waterjet driven craft (i.e., propeller driven) are rudders, propeller shafts, and propeller struts. These appendages can develop significant resistance, particularly at high speeds.

The lack of appendages on waterjet driven craft also provides a significant advantage in shallow water, as these craft typically have much shallower draught and are less susceptible to damage when run aground, as compared to craft with propellers bellow the hull.

Notwithstanding the negative effects on craft resistance, some appendages are of considerable value with respect to other craft dynamic characteristics. Although a significant source of drag at high speeds, a rudder is a primary contributor to craft stability when moving forward through the water, particularly when traveling at slow to medium speeds.

In simple terms, a rudder is a foil with a variable angle of attack. Actively varying the angle of attack (e.g., a turning maneuver) will increase the hydrodynamic force on one side of the rudder and decrease the hydrodynamic force on the opposite side, thereby developing a net force with a transverse component to yaw the craft in the desired direction.

Referring to FIG. 1 many craft are equipped with lifting devices known as trim-tabs (also known as tabs or transom-flaps) 200 or interceptors 206 (see FIG. 2). A trim tab 200 can be thought of as a variable-angle wedge that mounts to the transom 203 of a vessel and when engaged with a water stream creates upward force 204 on both the trim tab 200 and the hull bottom 205. Varying the Actuator 201 position will create varying amounts of hydrodynamic force 204 on the vessel. For example, extending the actuator 201 so as to actuate the trim tab further into the water stream will increase the angle of attack of the wedge, thereby increasing the hydrodynamic force 204 on the vessel. In contrast, referring to FIG. 2, an interceptor 206, mounted to transom 203 of a vessel and actuated by actuator 207, intercepts the flow of water under the transom of the vessel with a small blade 206 and creates an upward hydrodynamic force on the hull bottom 205. These devices that are found in both propeller and waterjet driven craft can be actuated to develop a hydrodynamic lifting force at the transom (stern) to trim the bow down, assisting the craft in getting up on plane and adjust the heel angle of the craft. Both trim-tabs and interceptors typically develop forces in the opposite direction of the actuation and along the same plane as the control surface motion.

It should be understood that while particular control surfaces are primarily designed to provide force or motion in a particular direction, these surfaces often also provide forces in other directions that may not be desired. For example, a steering nozzle, which is primarily intended to develop a yawing moment on the craft, in many cases will develop a rolling or heeling effect. This is due to the relative orientation of the nozzle turning axis. Referring, for illustration purposes, to FIGS. 3A, 3B, it is to be appreciated that in many waterjet propelled craft, the rotational axis of the steering nozzle 312, 314 is orthogonal to the bottom surface 16, 18 of the craft such that the rotational (transverse) thrust component generated by the steering nozzle is applied in a direction parallel to the bottom surface of the craft. Because of, for example the V-shaped or deep V-shaped hull, a rotational thrust component is generated at an angle (with respect to a horizontal surface) close or equal to the dead rise angle of the hull at the transom, which thereby causes a rolling or heeling moment in addition to a yawing (rotational) moment. The net rolling/heeling force imposed on a dual waterjet propelled craft can be equal to twice the force developed by a single waterjet. This is because the nozzles are typically controlled in unison when a waterjet driven craft is in a forward cruising or transiting mode.

Similarly, trim-tabs and interceptors 320, 322 are generally mounted at the transom 324, close to the free surface of the water such that a trimming force is developed orthogonal or perpendicular to the bottom surface 316, 318 of the hull at the transom. While the purpose of the trim tabs and interceptors is to develop up/down trimming forces at the transom, an inward component is also developed because a force is developed at an angle (with respect to a horizontal surface) close or equal to the dead rise angle of the hull at the transom plus 90 degrees. When both trim-tabs or interceptors are actuated together, the side components cancel out and the net force is close to or exactly vertical. When one tab or interceptor is actuated more than the other, for example when a rolling or healing force is desired, a side or yawing component is developed, causing a turning effect as well. The relative magnitude of the yawing component increases with increased dead rise angle. FIG. 4A illustrates how actuating the interceptor or trim-tab differentially in order to create a rolling force may also induce an unwanted yaw force. FIG. 4B illustrates how actuating the steering nozzles in order to create a yawing force may also induce an unwanted roll moment. These unwanted yawing and rolling forces in planning craft can make it difficult to control the craft at high speeds, particularly when automatic controls systems are employed such as Autopilots for automatically controlling the vessel heading and Ride Control Systems for minimizing pitch and roll disturbances.

BRIEF SUMMARY

Accordingly, there is a need for improved control systems and methods to control the motion of planing vessels.

According to one embodiment, a variable trim deflector system for a marine vessel is disclosed. The variable trim deflector system includes a first substantially planar surface having a first area wherein the first area forms at least a portion of an effective trim deflector area, and a second substantially planar surface having a second area wherein the second area forms an additional portion of the effective trim deflector area. The system also includes first and second pivot joints where one of the first and second pivot joints is configured to be fixed to the marine vessel. The first substantially planar surface can be pivoted about a combination of first and second pivot joints and the second planar surface can be pivoted about a combination of first and second pivot joints so that a magnitude of vertical and transverse force components created by the trim deflector can be varied.

According to various embodiments, the first and second substantially planar surfaces are not coplanar.

According to various embodiments, the system further comprises first and second actuators. According to aspects of this embodiment, the first and second actuators are controlled independently.

According to various embodiments, the first and second substantially planar surfaces are fixed relative to each other.

According to various embodiments, the relative angle of first and second substantially planar surfaces can vary.

According to various embodiments, the trim deflector further comprises a series of plates that can be positioned at different angles relative to each other. According to this embodiment, the series of plates that are connected to each other by hinged joints. According to this embodiment, at least one hinge axis direction is at a diagonal relative to the transverse axis of the craft. According to this embodiment, the system includes two hinged axes configured to deflect varying amounts of water in opposite transverse directions. According to this embodiment, the hinged joints are positioned along the same plane and intersect each other. According to this embodiment, at least one pivoting plate can rotate about either of the two intersecting hinged joints from the second pivoting axis. According to this embodiment, at least two hinged axes are coplanar and all hinged axes can be coplanar.

According to various embodiments, the first pivoting axis is oriented at right angles.

According to various embodiments, the first and second substantially planar surfaces rotate together along first and second pivot joints.

According to various embodiments, the second planar surface is coupled to the first planar surface and is configured to be articulated with respect to the first planar surface to adjust the effective trim deflector force.

According to various embodiments, the second planar surface is hingedly coupled to the first planar surface.

According to various embodiments, the first planar surface is configured to be coupled to an actuator, and the system also includes a first actuator having a first end configured to be coupled to the first planar surface and a second distal end configured to be coupled to a portion of the surface of the marine vessel. According to this embodiment, the first planar surface includes a mount for coupling to the first end of the actuator. According to this embodiment, the second distal end of the actuator is configured to be connected to a mount on the surface of the marine vessel.

According to various embodiments, the system also includes a third planar surface having a third area, wherein the third area forms an additional portion of the effective trim deflector area, and wherein the third planar surface is coupled to the first planar surface and is configured to be articulated with respect to the first planar surface to adjust the effective trim deflector force. According to this embodiment, the third planar surface is hingedly coupled to the first planar surface. According to this embodiment, the first planar surface is configured to be coupled to a portion of a surface of the marine vessel.

According to various embodiments, the second planar surface is configured to be coupled to a first actuator. According to this embodiment, the system also includes a first actuator having a first end configured to be coupled to the second planar surface and a second distal end configured to be coupled to a portion of the surface of the marine vessel. According to this embodiment, the second planar surface includes a mount for coupling to the first end of the first actuator. According to this embodiment, the second distal end of the first actuator is configured to be connected to a mount on the surface of the marine vessel. According to various embodiments, the system can include a third planar surface configured to be coupled to a second actuator. According to this embodiment, the system includes a second actuator having a first end configured to be coupled to the third planar surface and a second distal end configured to be coupled to a portion of the surface of the marine vessel. According to this embodiment, the third planar surface includes a mount for coupling to the first end of the second actuator. According to this embodiment, the second distal end of the second actuator is configured to be connected to a mount on the surface of the marine vessel.

According to one embodiment, a method for controlling a marine vessel having first and second steering nozzles and first and second trim deflectors to induce a net minor yawing force to the marine vessel to port or to starboard is disclosed. The method comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. According to this embodiment, the acts of generating the first set of actuator control signals and the second set of actuator control signals and coupling first set of actuator control signals and the second set of actuator control signals results in inducing a net minor yawing force to the marine vessel to port or to starboard by maintaining the first and second steering nozzles in a neutral position and actuating one of the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second trim deflectors to induce a net yawing force to the marine vessel without inducing any substantial rolling forces to marine vessel is disclosed. The method comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. According to this embodiment, the acts of generating the first set of actuator control signals and the second set of actuator control signals and coupling first set of actuator control signals and the second set of actuator control signals results in inducing a net yawing force to the marine vessel without inducing any substantial rolling forces to marine vessel, by actuating each of the first and second steering nozzles and one of the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second trim deflectors to induce a net rolling force to the marine vessel without inducing any substantial yawing forces to the marine vessel is disclosed. The method comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. According the this embodiment, the acts of generating the first set of actuator control signals and the second set of actuator control signals and coupling first set of actuator control signals and the second set of actuator control signals results in inducing a net rolling force to the marine vessel without inducing any substantial yawing forces to the marine vessel by actuating one of the first and second steering nozzles and one of the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second trim deflectors to induce a net trimming force to the marine vessel without inducing any substantial rolling or yawing forces to the marine vessel is disclosed. The method comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. According the this embodiment, the acts of generating the first set of actuator control signals and the second set of actuator control signals and coupling first set of actuator control signals and the second set of actuator control signals results in inducing a net trimming force to the marine vessel without inducing any substantial rolling or yawing forces to the marine vessel by actuating each of the first and second steering nozzles and by controlling the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second trim deflectors to induce a net stabilizing force to the marine vessel without inducing any substantial trimming forces to the marine vessel is disclosed. The method comprises generating at least a first set of actuator control signals and a second set of actuator control signals, wherein the first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. According to this embodiment, the acts of generating the first set of actuator control signals and the second set of actuator control signals and coupling first set of actuator control signals and the second set of actuator control signals results in inducing a net stabilizing force to the marine vessel without inducing any substantial trimming forces to the marine vessel by actuating each of the first and second steering nozzles and by actuating each of the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second trim deflectors to induce any of a net yawing force, a net rolling force, and a net trimming force to the marine vessel without inducing any other substantial forces to the marine vessel is disclosed. The method comprises generating at least a first set of actuator control signals and a second set of actuator control signals. The first set of actuator control signals is coupled to and controls the first and second steering nozzles, and the second set of actuator control signals is coupled to and controls the first and second trim deflectors, which have a plurality of surfaces having a plurality of orientations that result in a plurality of effective trim deflector surfaces. The acts of generating the first set of actuator control signals and the second set of actuator control signals and coupling first set of actuator control signals and the second set of actuator control signals results in inducing any of a net yawing force, a net rolling force, and a net trimming force to the marine vessel without inducing any other substantial forces to the marine vessel by controlling the first and second steering nozzles and by controlling each of the first and second trim deflectors. The act of generating the second set of actuator control signals comprises generating the second set of control signals to control the plurality of surfaces of the first and second trim deflectors to provide the plurality of effective trim deflector surfaces.

According to another embodiment, a method for controlling a marine vessel having first and second steering nozzles and first and second transom mounted trim deflectors to induce a net yawing force to the marine vessel without inducing any substantial rolling force to the marine vessel or to induce a net rolling force to the marine vessel without inducing any substantial yawing forces to the marine vessel is disclosed. The method comprises providing the first and second transom mounted trim deflectors, wherein the first and second trim deflectors each comprise a first planar surface having a first area that forms at least a portion of an effective trim deflector area, and a second planar surface having a second area that forms an additional portion of the effective trim deflector area, and wherein the second planar surface is coupled to the first planar surface and is configured to move with respect to the first planar surface to adjust the effective trim deflector area. The method also comprises generating at least a first set of actuator control signals and a second set of actuator control signals, coupling the first set of actuator control signals to and controlling the first and second steering nozzles and coupling the second set of actuator control signals to and controlling the first and second trim deflectors. The method further comprises controlling the first and second steering nozzles and the first and second trim deflectors in combination to induce a net yawing force to the marine vessel without inducing any substantial rolling force to the marine vessel, or to induce a net rolling force to the marine vessel without inducing any substantial yawing forces to the marine vessel.

According to one aspect, any of the methods may further comprise automatically detecting parameters of the marine vessel and of any of the first and second steering nozzles and the first and second trim deflectors during a maneuver of the marine vessel. According to another aspect, the method may further comprise modifying the act of inducing any of the net yawing force, the net rolling force, and the net trimming force to the marine vessel to account for the detected parameters.

According to one aspect, any of the methods may further comprise inducing a net minor yawing force to the marine vessel to port or to starboard by maintaining the first and second steering nozzles in a neutral position and actuating one of the first and second trim deflectors.

According to one aspect, any of the methods may further comprise inducing a net yawing force to the marine vessel without inducing any substantial rolling forces to marine vessel, by actuating the first and second steering nozzles and one of the first and second trim deflectors.

According to one aspect, any of the methods may further comprise inducing a net rolling force to the marine vessel without inducing any substantial yawing forces to the marine vessel by actuating the first and second steering nozzles and one of the first and second trim deflectors.

According to one aspect, any of the methods may further comprise arranging the turning axes of the steering nozzles inclined with respect to vertical in a transverse vertical plane, and inducing a net trimming force in both an up direction and a down direction to the marine vessel without inducing any substantial rolling or yawing forces to the marine vessel by actuating each of the first and second steering nozzles and by controlling the first and second trim deflectors.

According to one aspect, any of the methods may further comprise arranging the turning axes of the steering nozzles inclined with respect to the vertical in a transverse vertical plane, and increasing the stability of the marine vessel without inducing any substantial trimming forces to the marine vessel by actuating each of the first and second steering nozzles and by actuating each of the first and second trim deflectors.

According to one aspect, any of the methods may further comprise calculating the first and second sets of actuator control signals with at least one algorithm configured to apply the net force to the marine vessel.

According to one aspect, any of the methods may further comprise receiving a first vessel control signal from a first vessel control apparatus having at least two degrees of freedom, the first vessel control signal corresponding to a movement of the first vessel control apparatus along at least one degree of freedom. According to this aspect, any of the methods may further comprise receiving a second vessel control signal that corresponds to movement of a second vessel control apparatus along a rotational degree of freedom. According to this aspect, any of the methods may further comprise receiving the second vessel control signal from an autopilot controller. According to this aspect, any of the methods may further comprise generating a third set of actuator control signals that control a speed of a prime mover of a water jet propulsor corresponding to at least one of the first and second steering nozzles.

According to one aspect, any of the methods may further comprise generating the first set of actuator control signals such that a first degree of freedom of the first vessel control apparatus controls a net rolling force induced to the marine vessel, and generating the second set of actuator control signals such that a second degree of freedom of the first vessel control apparatus controls a net trimming force induced to the marine vessel. According to one embodiment, a system for controlling a marine vessel having first and second steering nozzles and first and second trim deflectors to induce minor yaw movements of the vessel to port or to starboard is disclosed. The system comprises a processor that is configured to provide a first set of actuator control signals and a second set of actuator control signals, wherein the first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. The processor is configured to provide the first set of actuator control signals and the second set of actuator control signal for inducing minor yaw movements of the vessel to port or to starboard, wherein the first and second steering nozzles are maintained in a neutral position and one of the first and second trim deflectors is actuated. The processor is further configured to generate the second set of control signals to control the plurality of surfaces of the first and second trim deflectors to provide the plurality of effective trim deflector surfaces.

According to another embodiment, a system for controlling a marine vessel having first and second steering nozzles and first and second trim deflectors to induce a net yawing force to the marine vessel without inducing any substantial rolling forces to marine vessel is disclosed. The system comprises a processor that is configured to provide a first set of actuator control signals and a second set of actuator control signals, wherein the first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. The processor is configured to provide the first set of actuator control signals and the second set of actuator control signal so that a net yawing force is induced to the marine vessel without inducing any substantial rolling forces to marine vessel, by actuating each of the first and second steering nozzles and one of the first and second trim deflectors. The processor is further configured to generate the second set of control signals to control the plurality of surfaces of the first and second trim deflectors to provide the plurality of effective trim deflector surfaces.

According to another, a system for controlling a marine vessel having first and second steering nozzles and first and second trim deflectors to induce a net rolling force to the vessel without inducing any substantial yawing forces to the marine vessel is disclosed. The system comprises a processor that is configured to provide a first set of actuator control signals and a second set of actuator control signals, wherein the first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. The processor is configured to provide the first set of actuator control signals and the second set of actuator control signal to induce a net rolling force to the vessel without inducing any substantial yawing forces to the marine vessel, by actuating one of the first and second steering nozzles and by actuating one of the first and second trim deflectors. The processor is further configured to generate the second set of control signals to control the plurality of surfaces of the first and second trim deflectors to provide the plurality of effective trim deflector surfaces.

According to another embodiment, a system for controlling a marine vessel having first and second steering nozzles and first and second trim deflectors to induce a net trimming force to the marine vessel without inducing any substantial rolling or yawing forces to the marine vessel is disclosed. The system comprises a processor that is configured to provide a first set of actuator control signals and a second set of actuator control signals, wherein the first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. According the this embodiment, the processor is configured to provide the first set of actuator control signals and the second set of actuator control signal to induce a net trimming force to the marine vessel without inducing any substantial rolling or yawing forces to the marine vessel by actuating each of the first and second steering nozzles and by controlling the first and second trim deflectors. The processor is further configured to generate the second set of control signals to control the plurality of surfaces of the first and second trim deflectors to provide the plurality of effective trim deflector surfaces.

According to another embodiment, a system for controlling a marine vessel having first and second steering nozzles and first and second trim deflectors to induce a net stabilizing force to the marine vessel without inducing any substantial trimming forces to the marine vessel is disclosed. The system comprises a processor that is configured to provide a first set of actuator control signals and a second set of actuator control signals, wherein the first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. The processor is configured to provide the first set of actuator control signals and the second set of actuator control signal to induce a net stabilizing force to the marine vessel without inducing any substantial trimming forces to the marine vessel by actuating each of the first and second steering nozzles and by actuating each of the first and second trim deflectors. The processor is further configured to generate the second set of control signals to control the plurality of surfaces of the first and second trim deflectors to provide the plurality of effective trim deflector surfaces.

According to another embodiment, a system for controlling a marine vessel having first and second steering nozzles and first and second trim deflectors to induce any of a net yawing force, a net rolling force, and a net trimming force to the marine vessel without inducing any other substantial forces to the marine vessel is disclosed. The system comprises a processor that is configured to provide a first set of actuator control signals and a second set of actuator control signals. The first set of actuator control signals are coupled to and control the first and second steering nozzles and the second set of actuator control signals are coupled to and control the first and second trim deflectors, which have a plurality of surfaces having a plurality of orientations that result in a plurality of effective trim deflector surfaces. The processor is configured to provide the first set of actuator control signals and the second set of actuator control signal to induce any of a net yawing force, a net rolling force, and a net trimming force to the marine vessel without inducing any other substantial forces to the marine vessel by controlling the first and second steering nozzles and by controlling the first and second trim deflectors. The processor is further configured to generate the second set of control signals to control the plurality of surfaces of the first and second trim deflectors to provide the plurality of effective trim deflector surfaces.

According to another embodiment, a system for controlling a marine vessel having first and second steering nozzles and first and second trim deflectors to induce a net yawing force to the marine vessel without inducing any substantial rolling force to the marine vessel, or to induce a net rolling force to the marine vessel without inducing any substantial yawing force to the marine vessel is disclosed. The first and second trim deflectors each comprise a first planar surface having a first area wherein the first area forms at least a portion of an effective trim deflector area, and a second planar surface having a second area wherein the second area forms an additional portion of the effective trim deflector area, and wherein the second planar surface is coupled to the first planar surface and is configured to move with respect to the first planar surface to adjust the effective trim deflector area. A processor is configured to provide a first set of actuator control signals and a second set of actuator control signals, wherein the first set of actuator control signals are to be coupled to and control the first and second steering nozzles and the second set of actuator control signals are to be coupled to and control the first and second trim deflectors. The processor is also configured to control the first and second steering nozzles and the first and second trim deflectors in combination to induce a net yawing force to the marine vessel without inducing any substantial rolling force to the marine vessel, or to induce a net rolling force to the marine vessel without inducing any substantial yawing force to the marine vessel.

According to one aspect, any embodiment of the system may further comprise at least one detector that automatically detects parameters of the marine vessel and of any of the first and second steering nozzles and the first and second trim tabs during a maneuver of the marine vessel. According to another aspect, the system may further comprise an active control module that modifies any of the net yawing force, the net rolling force, and the net trimming force to the marine vessel to account for the detected parameters.

According to one aspect, any embodiment of the system may have the processor further configured to provide the first set of actuator control signals and the second set of actuator control signals so that for minor yaw movements of the vessel to port or to starboard, the first and second steering nozzles are maintained in a neutral position and one of the first and second trim deflectors is actuated.

According to one aspect, any embodiment of the system may have the processor further configured to provide the first set of actuator control signals and the second set of actuator control signal so that a net yawing force is induced to the marine vessel without inducing any substantial rolling forces to marine vessel, by actuating the first and second steering nozzles and one of the first and second trim deflectors.

According to one aspect, any embodiment of the system may have the processor further configured to provide the first set of actuator control signals and the second set of actuator control signal to induce a net rolling force to the vessel without inducing any substantial yawing forces to the marine vessel, by actuating the first and second steering nozzles and by actuating one of the first and second trim deflectors.

According to one aspect, any embodiment of the system may further be configured so that the first and second steering nozzles are arranged so that their turning axes are inclined with respect to the vertical in a transverse vertical plane, and the processor is configured to provide the first set of actuator control signals and the second set of actuator control signal to induce a net trimming force to the marine vessel in both an up direction and a down direction without inducing any substantial rolling or yawing forces to the marine vessel by actuating each of the first and second steering nozzles and by controlling the first and second trim deflectors.

According to one aspect, any embodiment of the system may have further be configured so that the first and second steering nozzles are arranged so that their turning axes are inclined with respect to the vertical in a transverse vertical plane, and the processor is configured to provide the first set of actuator control signals and the second set of actuator control signal to increase the stability of the marine vessel without inducing any substantial trimming forces to the marine vessel by actuating each of the first and second steering nozzles and by actuating each of the first and second trim deflectors.

According to one aspect, any embodiment of the system may have a first vessel control apparatus having at least two degrees of freedom that provides a first vessel control signal corresponding to a movement of the first vessel control apparatus along at least one degree of freedom. According to this aspect, the first vessel control apparatus can comprise a two-axis control stick. According to this aspect, the processor can be configured to provide the first actuator control signals and the second actuator control signals such that a first axis of the two-axis control stick controls a net rolling force induced to the marine vessel and a second axis of the two-axis control stick controls a net trimming force induced to the marine vessel. According to this aspect, the system can further comprise a second vessel control apparatus having a third degree of freedom and providing a second vessel control signal corresponding to movement of the second vessel control apparatus along the third degree of freedom. According to this aspect, the second vessel control apparatus can have a rotational degree of freedom and provide a second vessel control signal corresponding to movement of the second vessel control apparatus along the rotational degree of freedom.

According to one aspect, any embodiment of the system may have an interface coupled to the processor that provides for communication with an autopilot controller.

According to one aspect, any embodiment of the processor is configured to provide a third actuator control signal and the vessel comprises a prime mover responsive to and controlled by the third actuator control signal.

According to one aspect, any embodiment of the system may have the second planar surface hingedly coupled to the first planar surface.

According to one aspect, any embodiment of the system may have the first planar surface configured to be coupled to a portion of a surface of the marine vessel. According to this aspect, the first planar surface is configured to be coupled to an actuator, and the system further comprises a first actuator having a first end configured to be coupled to the first planar surface and a second distal end configured to be coupled to a portion of the surface of the marine vessel. According to this aspect, the first planar surface includes a mount for coupling to the first end of the actuator. According to this aspect, the second distal end of the actuator is configured to be connected to a mount on the surface of the marine vessel.

According to one aspect, any embodiment of the system may have the variable trim deflector having a third planar surface having a third area, wherein the third area forms an additional portion of the effective trim deflector area, and wherein the third planar surface is coupled to the first planar surface and is configured to be moved with respect to the first planar surface to adjust the effective trim deflector area. According to this aspect, the third planar surface can be hingedly coupled to the first planar surface. According to this aspect, the system can further comprise a second actuator having a first end configured to be coupled to the third planar surface and a second distal end configured to be coupled to a portion of the surface of the marine vessel. According to this aspect, the third planar surface includes a mount for coupling to the first end of the second actuator. According to this aspect, the second distal end of the second actuator is configured to be connected to a mount on the surface of the marine vessel.

According to one embodiment, a variable trim deflector system for a marine vessel is disclosed. The variable trim deflector system includes a first planar surface having a first area wherein the first area forms at least a portion of an effective trim deflector area. The variable trim deflector system also includes a second planar surface having a second area wherein the second area forms an additional portion of the effective trim deflector area. The second planar surface is coupled to the first planar surface and is configured to be moved with respect to the first planar surface to adjust the effective trim deflector area.

According to one aspect, any embodiment of the variable trim deflector system has the second planar surface hingedly coupled to the first planar surface.

According to one aspect, any embodiment of the variable trim deflector system has the first planar surface configured to be coupled to a portion of a surface of the marine vessel.

According to one aspect, any embodiment of the variable trim deflector system has the first planar surface configured to be coupled to an actuator, and further comprises a first actuator having a first end configured to be coupled to the first planar surface and a second distal end configured to be coupled to a portion of the surface of the marine vessel. According to this aspect, the first planar surface includes a mount for coupling to the first end of the actuator. According to this aspect, the second distal end of the actuator is configured to be connected to a mount on the surface of the marine vessel.

According to one aspect, any embodiment of the variable trim deflector system has a third planar surface having a third area, wherein the third area forms an additional portion of the effective trim deflector area, and wherein the third planar surface is coupled to the first planar surface and is configured to be moved with respect to the first planar surface to adjust the effective trim deflector area. According to this aspect, the third planar surface can be hingedly coupled to the first planar surface. According to this aspect, the third planar surface is configured to be coupled to an actuator. According to this aspect, the system further comprises a second actuator having a first end configured to be coupled to the third planar surface and a second distal end configured to be coupled to a portion of the surface of the marine vessel. According to this aspect, the third planar surface includes a mount for coupling to the first end of the second actuator. According to this aspect, the second distal end of the second actuator is configured to be connected to a mount on the surface of the marine vessel.

BRIEF DESCRIPTION OF DRAWINGS

The foregoing and other advantages of the application will be more fully appreciated with reference to the following drawings in which:

FIG. 4A illustrates how actuating the trim-tab of the vessel of FIGS. 3A-3B differentially may induce an unwanted yaw force;

FIG. 4B illustrates how actuating the steering nozzles of the vessel of FIGS. 3A-3B may induce an unwanted roll moment;

FIG. 9A illustrates a rear view of a marine vessel with the trim-deflectors of FIGS. 5A and 6A configured to provide yawing forces without any roll, in the UP position;

FIG. 9B illustrates a rear view of a marine vessel with the trim-deflectors of FIGS. 5A and 6A configured to provide yawing forces without any roll, in the DOWN position and resultant force vector;

FIG. 10A illustrates a rear view of a marine vessel with two or more 1 DOF trim deflectors in the UP position;

FIG. 10B illustrates a rear view of a marine vessel with two or more 1 DOF trim deflectors in the down position and resultant variable force vectors;

FIG. 13A illustrates a rear view of a marine vessel with steering nozzles and the trim-deflectors of FIG. 12D, with the port trim deflector in the DOWN position and resultant force vector;

FIG. 13B illustrates a rear view of a marine vessel with steering nozzles and the trim-deflectors of FIG. 12D, with the port trim deflector positioned to create a net transverse (yaw) force on the marine vessel without inducing a roll moment;

FIG. 13C illustrates a rear view of a marine vessel with steering nozzles and the trim-deflectors of FIG. 12D, with the port trim deflector positioned to induce a roll moment without inducing a transverse force to the marine vessel;

FIG. 14A illustrates a rear view of a marine vessel with steering nozzles and with the trim-deflectors of FIG. 12I, with the port trim deflector in the DOWN position and resultant force vector;

FIG. 14B illustrates a rear view of a marine vessel with steering nozzles and the trim-deflectors of FIG. 12I, with the port trim deflector positioned to create a net transverse (yaw) force on the marine vessel without inducing a significant rolling moment to the marine vessel;

FIG. 14C illustrates a rear view of a marine vessel with steering nozzles and the trim-deflectors of FIG. 12I, with the port trim deflector positioned to induce a roll moment without inducing a significant yawing force on the marine vessel;

FIG. 21A illustrates one embodiment of a decoupled yaw controller for use with the folding trim deflector;

FIG. 21B illustrates one embodiment of a decoupled yaw controller for use with the articulating trim deflector;

FIG. 22A illustrates one embodiment of a decoupled roll controller for use with the folding trim deflector;

FIG. 23A illustrates one embodiment of a decoupled trim controller for use with the folding trim deflector;

DETAILED DESCRIPTION

There is a need for a system and method to decouple forces developed by trimming devices and control surfaces in planing craft such that yawing, trimming and rolling forces can be applied individually and in combination without developing any unwanted motions or forces. The system disclosed herein has several aspects. One aspect of the system is configured to individually control orientation and total effective area of each trim deflector, for many purposes. Accordingly, there is disclosed a transom mounted device and system that can develop forces that are not directionally constrained by the shape of the hull and are not confined to act along the same plane as the motion of the control surface.

Figure 5C:
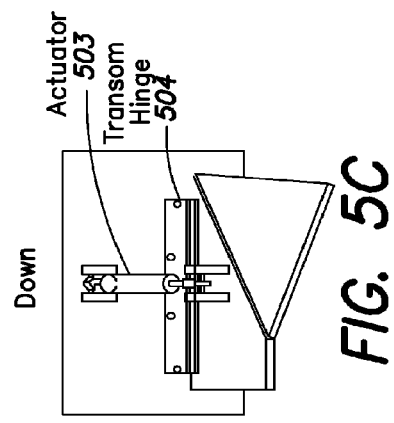
FIG. 5C illustrates rear view of the one degree of freedom asymmetric trim-deflector of FIG. 5A in a DOWN position.
Figure 6C:
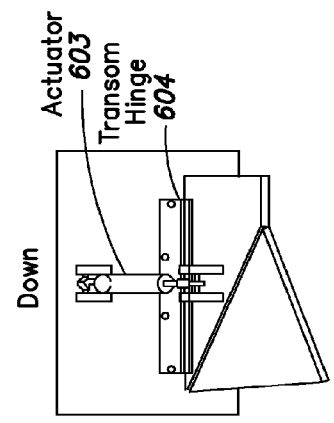
FIG. 6C illustrates a rear view of the one degree of freedom asymmetric trim-deflector of FIG. 6A in a DOWN position.
Figure 5B:
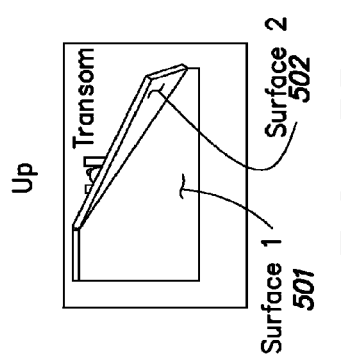
FIG. 5B illustrates rear view of the one degree of freedom asymmetric trim-deflector of FIG. 5A in an UP position.
Figure 6B:
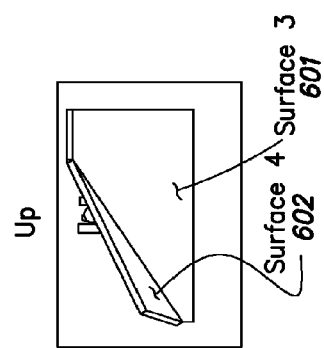
FIG. 6B illustrates a rear view of the one degree of freedom asymmetric trim-deflector of FIG. 6A in a UP position.
Figure 5A:
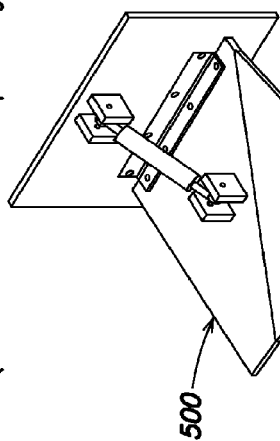
FIG. 5A illustrates a perspective view of a one degree of freedom asymmetric trim-deflector.
Figure 6A:
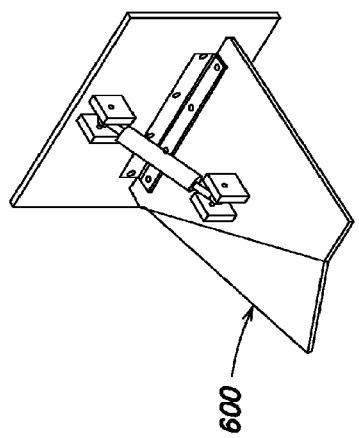
FIG. 6A illustrates a perspective view of a one degree of freedom asymmetric trim-deflector.
Figure 7A:
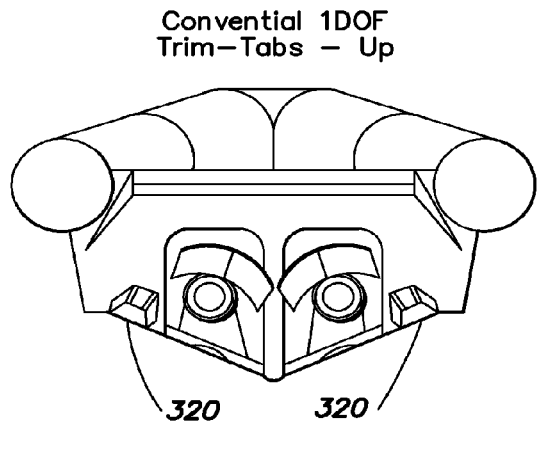
FIG. 7A illustrates a rear view of the marine vessel of FIG. 3A with the trim-deflectors in the UP position.
Figure 7B:
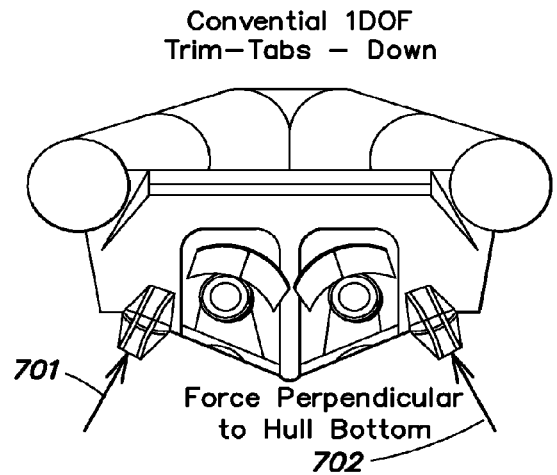
FIG. 7B illustrates a rear view of the marine vessel of FIG. 3A with the trim-deflectors in the DOWN position and resultant force vectors.
Figure 8A:
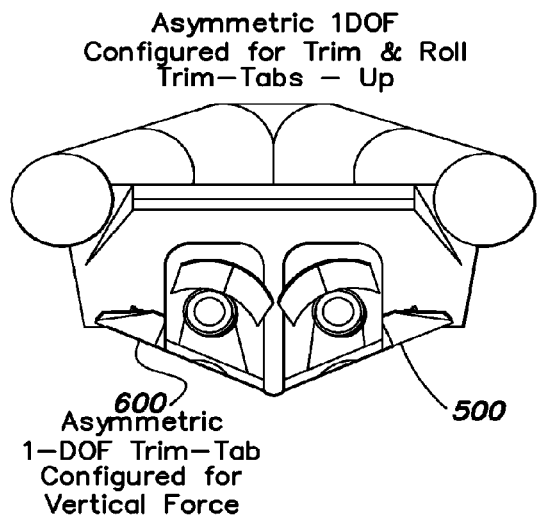
FIG. 8A illustrates a rear view of a marine vessel with the trim-deflectors of FIGS. 5A and 6A configured to provide trimming only, in the UP position.
Figure 8B:
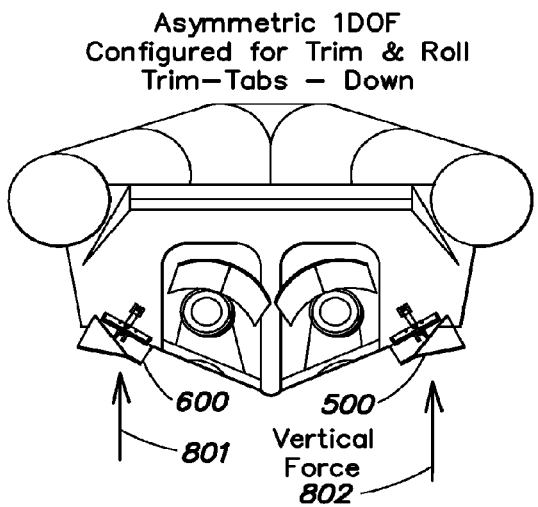
FIG. 8B illustrates a rear view of a marine vessel with the trim-deflectors of FIGS. 5A and 6A configured to provide trimming only, in the DOWN position and resultant force vectors.
Figure 11:
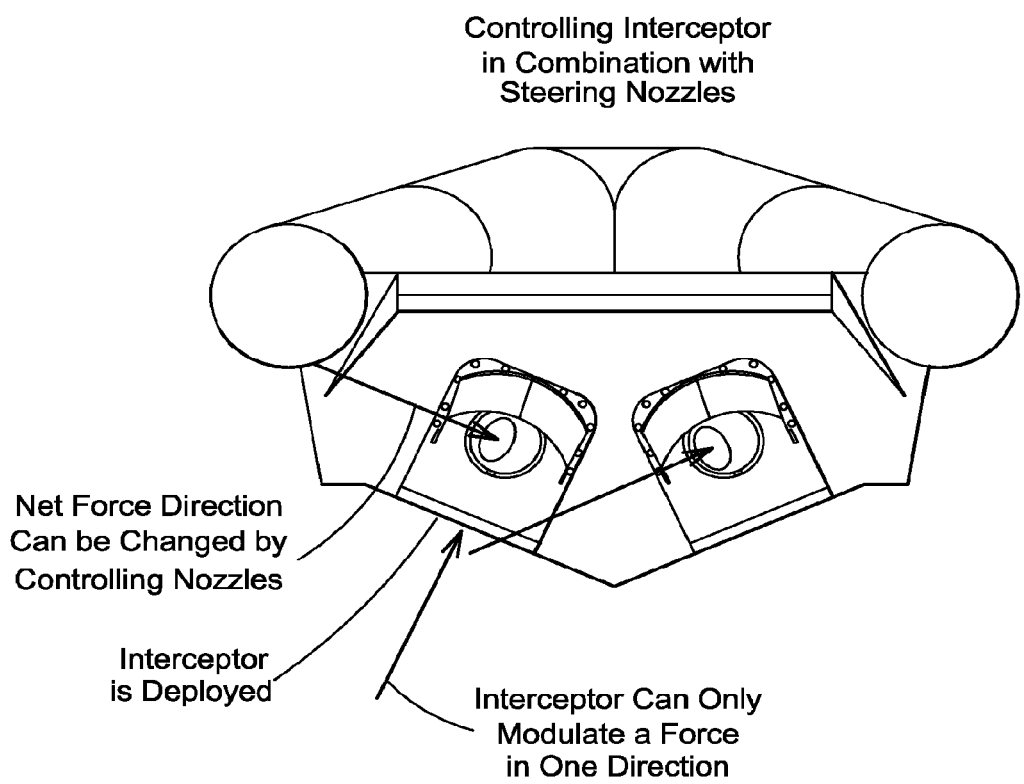
FIG. 11 illustrates a rear view of a marine vessel having conventional steering nozzles and the trim-tabs and resultant force vectors.

According to one embodiment, the device and system include a pair of 1 degree of freedom (hereinafter "DOF") asymmetric trim-deflectors (500 and 600), shown in FIGS. 5A-5C and 6A-6C. Each trim deflector has multiple surfaces (501, 502 and 601, 602) that contact the water at different angles. Referring to FIGS. 5C and 6C, it can be seen that surfaces 501 and 601 are positioned such that a certain volume of water passing under the flap is deflected to one side (relative to the motion of actuators 503, 603). Trim deflectors 500 and 600 also include at least one additional surface 502 and 602 that is configurable with respect to surfaces 501 and 601, respectively. Referring, for example to FIG. 8B, with this trim deflector arrangement, a resultant force can be developed on the marine vessel that is not directed along the same plane as the trim deflector 500, 600 motion as a result of actuation by actuators 503, 603 and that is not normal to the bottom of the hull (the deep V bottom of the hull). Referring to FIG. 8B, if the deflector is properly shaped and positioned as illustrated, a force 801, 802 is developed that is strictly in the Z (upward) direction. Similarly, it is to be appreciated that if the trim deflectors 500 and 600 are differentially actuated, this arrangement induces a roll force without yaw. In addition, referring to FIG. 9B, trim deflectors 901 and 902 are differentially actuated so that one (901) is down and the other (902) is up, this arrangement induces a force in the X (transverse) direction 903 that produces a yaw force without any roll. Referring to FIGS. 7A and 7B, force vectors 701 and 702 are developed by conventional trim-tabs when they are actuated upward and downward. It is to be appreciated that each conventional trim-tab will develop a transverse force component that is canceled out if they are actuated together; however, if they are actuated differentially, a net transverse force will be applied to the craft, which will likely induce an unwanted yaw force. Trim-deflectors 500 & 600 shown in FIG. 8B has surfaces 501, 502, 601 and 602 (See FIGS. 5A-5C and 6A-6C) that can be configured such that the force created by actuating the trim deflector 600 down, as shown in FIG. 8B, will have a minimal transverse force component. It is to be appreciated that with this embodiment of trim-deflectors 500, 600 each has a simple compound surface distribution (2-surfaces for explanation purposes). It is also to be appreciated, and will be further described herein, that the trim deflector arrangement can be further modified to have a plurality of surfaces that contact the water at different angles and that can be moved relative to one another to create a plurality of effective orientations and total effective area of the trim deflectors. It should also be appreciated that instead of a trim deflector made up of discrete flat surfaces, an arrangement comprising a single or multiple curved surfaces can also be used.

It can be seen that the single DOF trim-deflectors 500, 600 with compound or curved surfaces, can be used to modify the direction of trimming forces that are generated by the trim-deflectors; however, the ability to fully control the magnitude and direction of the forces applied to the marine vessel in real time results in a need for trim deflectors with multiple degrees of freedom. Referring to FIGS. 10A and 10B, according to one embodiment, the multiple degrees of freedom and resulting ability to control the magnitude and direction of the force vectors is accomplished by providing and controlling two or more 1-DOF trim deflectors 1001, 1002 on each side of the craft such that they can be independently controlled so as to be actuated differentially or in unison.

According to another embodiment, a device and system for controlling the craft includes a trim deflector arrangement with two or more degrees of freedom (DOF). As will be described herein, with this arrangement of a multiple DOF trim deflector, an overall geometry and effective total deflective surface of the trim-deflector surface can be more effectively modified or controlled. Such a trim deflector device can be controlled to develop forces in a range of directions by independently actuating the multiple degrees of freedom. One embodiment of a 2-DOF articulating trim-deflector design 1201 is shown in FIGS. 12D-H. This embodiment is an example of one type of transom-mounted trim deflector that has two degrees of freedom. With this arrangement, surfaces 1212-1216 are positioned via two independently controlled actuators 1210, 1211. Actuator 1211 controls the up-down motion of the trim deflector in a fashion similar to a conventional trim-deflector. Actuator 1210 controls the side-to-side motion of the trim-deflector. By controlling both actuators independently, a net resultant force can be developed such that the resultant direction is infinitely varied between two extremes. For example, referring to FIG. 13B, the port (left) trim-deflector 1201 shown in FIG. 13B is positioned to create a net transverse (yaw) force on the marine vessel without inducing a roll moment. Referring now to FIG. 13C, the port trim-deflector 1201 is positioned differently to create a net vertical force on the marine vessel in order to induce a roll moment without inducing a transverse force to the marine vessel.

Figure 12A:
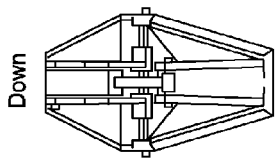
FIG. 12A illustrates a perspective view of a conventional 1 DOF trim-tab.
Figure 12B:
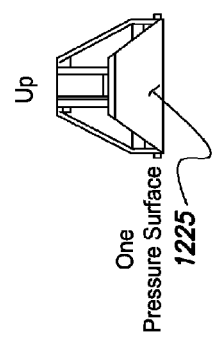
FIG. 12B illustrates a rear view of a conventional 1 DOF trim-tab in the UP position.
Figure 12C:
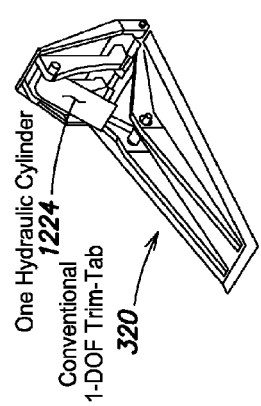
FIG. 12C illustrates a rear view of a conventional 1 DOF trim-tab in the DOWN position.
Figure 12D:
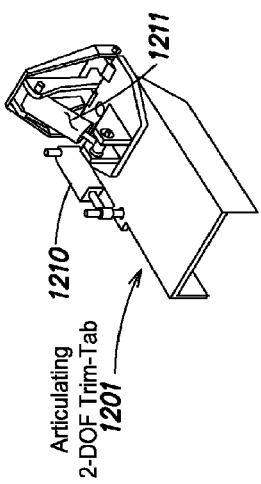
FIG. 12D illustrates a perspective view of an embodiment of a 2 DOF trim-deflector.
Figure 12E:
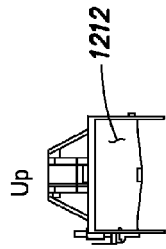
FIG. 12E illustrates a rear view of the embodiment of the 2 DOF trim-deflector of FIG. 12D in the up position.
Figure 12F:
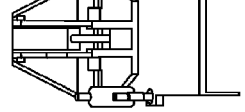
FIG. 12F illustrates a rear view of the embodiment of the 2 DOF trim-deflector of FIG. 12D in the DOWN position.
Figure 12G:
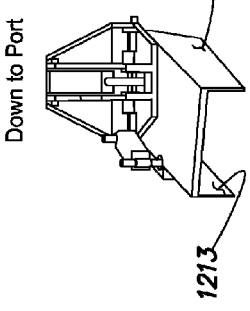
FIG. 12G illustrates a rear view of the embodiment of the 2 DOF trim-deflector of FIG. 12D in a TO PORT position.
Figure 12H:
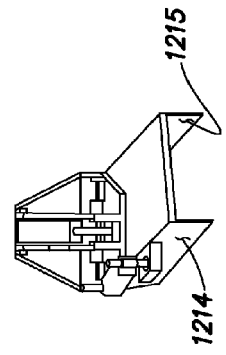
FIG. 12H illustrates a rear view of the embodiment of the 2 DOF trim-deflector of FIG. 12D in a TO STARBOARD position.
Figure 12K:
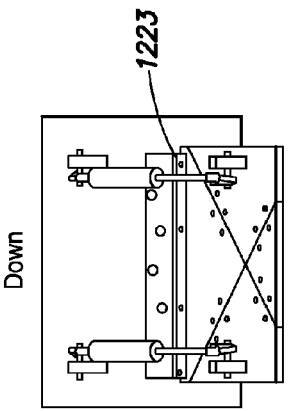
FIG. 12K illustrates a rear view of the embodiment of the 2 DOF trim-deflector of FIG. 12I in the DOWN position.
Figure 12J:
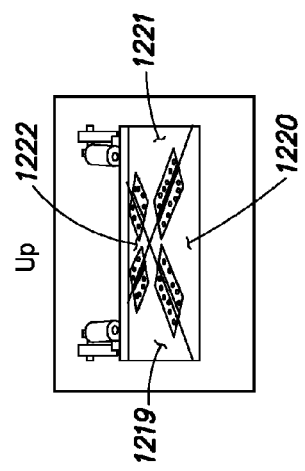
FIG. 12J illustrates a rear view of the embodiment of the 2 DOF trim-deflector of FIG. 12I in the up position.
Figure 12M:
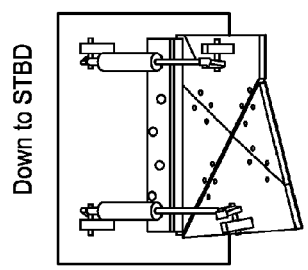
FIG. 12M illustrates a rear view of the embodiment of the 2 DOF trim-deflector of FIG. 12I in a TO STARBOARD position.
Figure 12I:
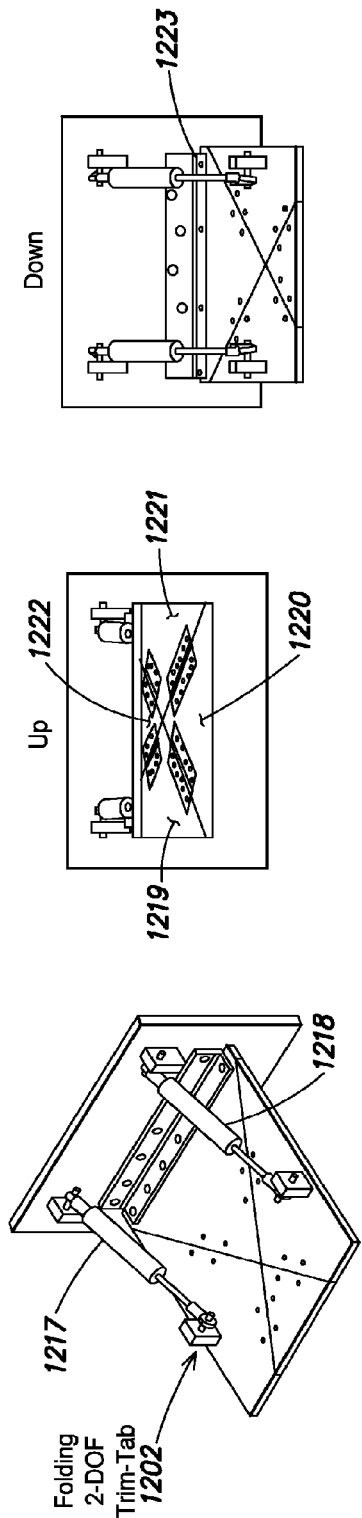
FIG. 12I illustrates a perspective view of another embodiment of a 2 DOF trim-deflector.
Figure 12L:
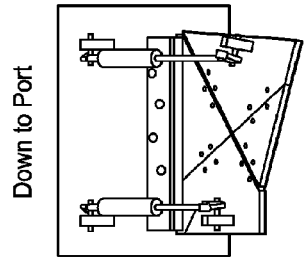
FIG. 12L illustrates a rear view of the embodiment of the 2 DOF trim-deflector of FIG. 12I in a TO PORT position.

Referring to FIGS. 12I-12M, another embodiment of a device and system for controlling the craft includes a folding trim-deflector arrangement 1202 with two degrees of freedom (DOF). This variable geometry trim deflector can be controlled to achieve similar results to the articulating trim-deflector 1201 of FIG. 12D, by using two actuators 1217 and 1218 to control four linked surfaces 1219-1222. When positioned differentially, as illustrated in FIGS. 12L and 12M, the actuators 1217 and 1218 will deflect downward the right or left corner of the trim-deflector. Referring to FIG. 12K, all four plates can be controlled to pivot up or down together around hinged joint 1223 in response to common motion of the two actuators 1217 and 1218. By applying a combination of common and differential movements of actuators 1217 and 1218, the magnitude and direction of the resultant force on the marine vessel can be controlled. FIG. 14B illustrates how the trim-deflector 1202 could be actuated to develop a transverse (yaw) force on the marine vessel without inducing a significant rolling moment to the marine vessel, and FIG. 14C illustrates how the trim-deflector 1202 can be actuated to induce a rolling force on the marine vessel without inducing a significant yawing force on the marine vessel.

Figure 15A:
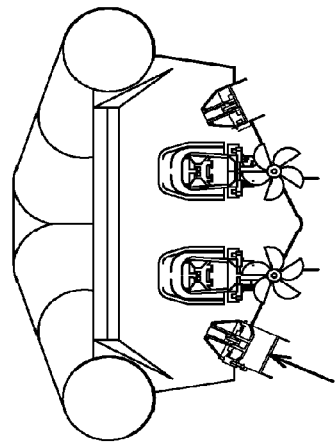
FIG. 15A illustrates a rear view of a marine vessel with outdrives and the trim-deflectors of FIG. 12D, with the port trim deflector in the DOWN position and resultant force vector.
Figure 15B:
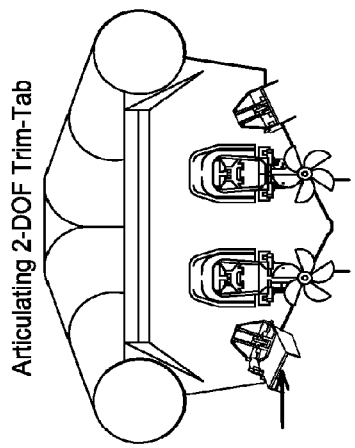
FIG. 15B illustrates a rear view of a marine vessel with outdrives and the trim-deflectors of FIG. 12D, with the port trim deflector positioned to create a net transverse (yaw) force on the marine vessel without inducing a roll moment.
Figure 15C:
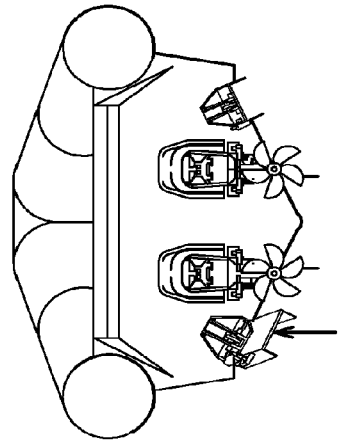
FIG. 15C illustrates a rear view of a marine vessel with outdrives and the trim-deflectors of FIG. 12D, with the port trim deflector positioned to induce a roll moment without inducing a transverse force to the marine vessel.
Figure 16A:
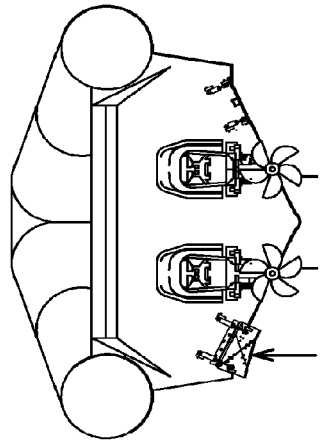
FIG. 16A illustrates a rear view of a marine vessel with outdrives and with the trim-deflectors of FIG. 12I, with the port trim deflector in the DOWN position and resultant force vector.
Figure 16B:
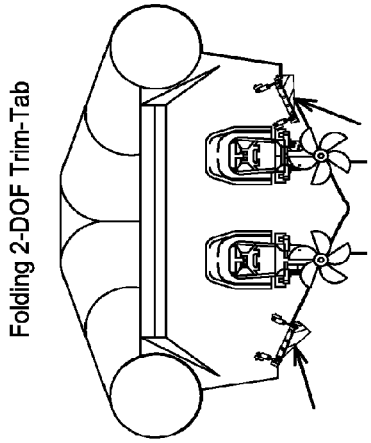
FIG. 16B illustrates a rear view of a marine vessel with outdrives and the trim-deflectors of FIG. 12I, with the port trim deflector positioned to create a net transverse (yaw) force on the marine vessel without inducing a significant rolling moment to the marine vessel.

According to another embodiment, the trim deflector 1202 can be provided by a flexible plate instead of using crossing hinges. It is to be appreciated that according to this arrangement, similar results can be achieved if a flexible plate were used that is sufficiently flexible to twist in response to the differential motion of the actuators. It should also be appreciated that smart materials such as piezoelectrics or shape memory alloys (SMA) could be used to actuate the surface(s) and/or measure the forces or displacements on the surfaces. It should also be appreciated that a trim deflector having more than 2 DOF can be obtained by providing more than two actuators corresponding to the number of degrees of freedom, or positioning the hinges differently so that they do not cross, or implementing a number of hinged surfaces that more or less correspond to those depicted in the example shown in FIG. 12I. It is contemplated that one skilled in the art could modify the trim deflectors using one or more of these structures to implement a plurality of different trim deflectors having varying DOF and varying configurations, and such modifications are considered to be within the scope of this disclosure. Although the examples and figures herein refer to vessels fitted with waterjet propulsion units, it is to be understood that the devices and system of this disclosure can be used to achieve similar results with vessels utilizing other forms of propulsion and steering, such as outdrives (see FIGS. 15A-C and 16A-C), surface drives (steerable and nonsteerable) and conventional propellers with steering rudders. Thus, for example, referring to FIG. 15B, the port (left) trim-deflector 1201 shown in FIG. 13B can be similarly positioned on a marine vessel equipped with an outdrive to create a net transverse (yaw) force without inducing a roll moment. Similarly, referring to FIG. 15C, the port trim-deflector 1201 is positioned differently to create a net vertical force on the marine vessel equipped with an outdrive in order to induce a roll moment without inducing a transverse force to the marine vessel. Similarly, referring to FIGS. 16A-16C, by applying a combination of common and differential movements of actuators 1217 and 1218, the magnitude and direction of the resultant force on the marine vessel equipped with an outdrive can be controlled. FIG. 16B illustrates how the trim-deflector 1202 could be actuated to develop a transverse (yaw) force on the marine vessel equipped with an outdrive, without inducing a significant rolling moment to the marine vessel, and FIG. 14C illustrates how the trim-deflector 1202 can be actuated to induce a rolling force (or moment) on the marine vessel equipped with an outdrive, without inducing a significant yawing force on the marine vessel.

It is to be appreciated that with any of the embodiments discussed herein, many types of actuators can be used, such as linear or rotary hydraulic, electro-hydraulic or electromechanical actuators. However, according to aspects of the system, it is contemplated as will be discussed further herein that if a hydraulic or electro-hydraulic actuator is used, it is possible to measure the steady and dynamic forces of each actuator by using pressure sensors, thereby allowing a control system of this system to calculate or estimate the resultant force in real time.

One embodiment of a control system that can be used for controlling the actuators of both trim deflectors is similar to the control system described in commonly owned, U.S. Pat. No. 7,641,525 B2, herein incorporated by reference. For example, the systems described in FIGS. 11-17 U.S. Pat. No. 7,641,525 B2 are similar to the systems that can be used to control the multiple DOF him deflectors shown in FIGS. 12D and 12I, except instead of controlling the steering nozzles in combination with the trim deflectors in order to decouple the forces (as described in U.S. Pat. No. 7,641,525 B2), a similar end result can be achieved by individually controlling the two actuators of the multiple DOF trim-deflector of FIGS. 12D and 12I. For example, this patent discloses with reference to FIGS. 11-17 of U.S. Pat. No. 7,641,525 B2, the various systems have four separate actuator outputs: port trim-deflector output, port nozzle output, starboard trim-deflector output, and starboard nozzle output. These four separate outputs can be modified to be outputs for: port trim-deflector actuator #1, port trim-deflector actuator #2, starboard trim-deflector actuator #1 and starboard trim-deflector actuator #2 as shown in FIGS. 21-25 of this application. Although these four outputs should be sufficient to produce substantially decoupled roll and yaw forces according to the devices and system of this disclosure, it is understood that the control system can also include outputs for engine RPM, waterjet steering nozzle and reversing bucket (if a waterjet propulsor is installed on the marine vessel) or drive steering and trim angle (if an outdrive is installed on the marine vessel) or rudder angle.

Figure 17A:
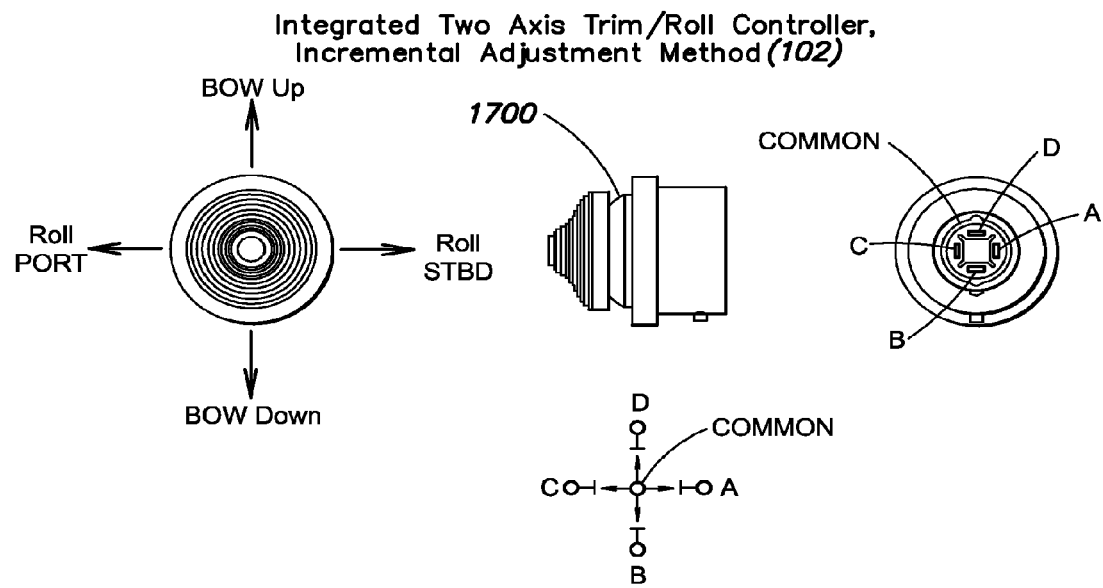
FIG. 17A illustrates an exemplary embodiment of a two-axis trim/roll control device.
Figure 17B:
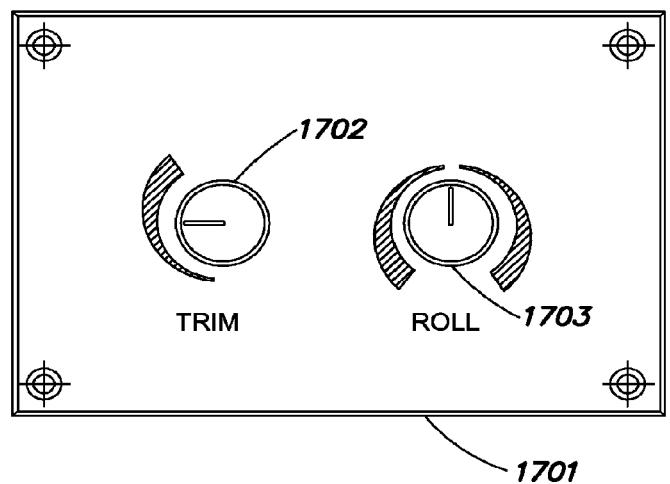
FIG. 17B illustrates another exemplary embodiment of a two-axis trim/roll control device.

It is desirable according to one aspect of the systems disclosed herein, to provide separate or integrated control inputs interfaced to a controller that is configured for commanding the trim, roll and yaw forces that are to be applied to craft by the trim-tabs. Referring to FIGS. 17A and 17B, there is illustrated an exemplary two-axis trim/roll control device 1700 that can be, for example, mounted to a control joystick such that it can be manipulated using one's thumb or mounted, for example, separately on the arm of a chair or console. Operation of the device 1700 of FIG. 17A by a user, which is comprised of four switches that are integrated into one two-axis device, as integrated with a controller according to an embodiment of the invention can be, by way of example, as follows: when the device is pushed upward, the device signals a desired increase in bow trim to the controller. As long as the device is pushed upward, the controller, as described infra, is configured to control the trim-deflectors (such as articulating type 1201 or folding type 1202) to trim the bow up, provided that there is sufficient movement (stroke) available in the actuators. Similarly, if the device 1700 is pushed to the right, the device provides a signal to the controller, which is configured as described infra, to control the trim-deflectors so that the craft will roll to starboard. As long as the device is pushed to the right, the craft will continue to roll to starboard provided that there is sufficient movement (stroke) available in the actuators. Trimming the bow down and rolling the vessel to port can be accomplished with similar but opposite motions down with the control device, so that the control device provides a signal to the controller, as described infra, which is configured to control the trim-deflectors so that the craft will effect such movements. A similar control device, that can be used in combination with the controller configured as described herein, is described in U.S. Pat. No. 7,641,525 B2 to control waterjets in combination with trim-deflectors or interceptors, and the device and description are herein incorporated by reference. It is to be appreciate that for the devices and systems of this disclosure for achieving substantial decoupling of the roll and yaw forces applied to a marine vessel, it is not necessary with certain devices and systems of this disclosure to account or provide for the control of the other devices on the marine vessel such as waterjets or steerable propellers, though it is appreciated that such control devices and corresponding controllers are provided for a marine vessel, because the trim-deflectors 1201 and 1202 and corresponding controller system as disclosed herein have 2 degrees of freedom and are able to substantially decouple the roll and yaw forces without the need for additional propulsion device or force effectors.

Trim/roll controller 1700 controls the trim-tab positions incrementally such that the bow will move up, down, left or right as long as the controller is actuated. It is also possible to control the trim-deflectors in an absolute fashion where the trim-tab positions correspond directly to the positions of a control device. An example of an absolute type of control device is panel 1701 illustrated in FIG. 17B where trim and roll force adjustments are made by adjusting the absolute positions of trim and roll knobs 1702 and 1703. According to any of the embodiments of the trim deflectors and systems disclosed herein, the controller device can be configured so that moving trim knob 1702 clockwise will trim the bow upward and a moving the trim knob counterclockwise movement will trim the bow downward. Similarly, the controller device can be configured so that moving Roll Knob 1703 clockwise will roll the craft to starboard and a counterclockwise rotation of Roll Knob 1703 will roll the craft in the counterclockwise direction. In contrast to the incremental approach that control device 1700 in combination with a configured controller uses to apply forces, the forces created by panel 1701 in combination with a configured controller are proportional to the positions of trim and roll knobs 1702 and 1703 respectively.

It is to be appreciated that the two-axis trim/roll control device 1700 shown in FIG. 17A is one of many types of incremental control devices as known in the art that an operator can use to command different levels of trim and rolling forces to be applied to the craft, and that according to one aspect of the embodiments of trim deflectors and systems disclosed herein, any control device that allows these command movements by an operator can be used with the configured controller as disclosed herein. For example, although the two-axis device 1700 shown in FIG. 17A is comprised of switches, other trim/roll controllers utilize variable output transducers or potentiometers and can also be used with the any embodiment of the devices and systems disclosed herein. Other examples of trim/roll controls that can be used with any of the embodiments of the devices and systems disclosed herein include individual devices for roll and trim or four separate devices for Bow Up, Bow Down, Roll Port and Roll Starboard such as, for example, four switches arranged in a diamond pattern. Similarly, control panel 1701 is one of many possible types of absolute or proportional control input devices that can be used with any of the embodiments of the devices and systems disclosed herein. For example, individual knobs 1702 and 1703 can be replaced with other types of proportional devices or combined into a single multi-axis proportional device.

Figure 18C:
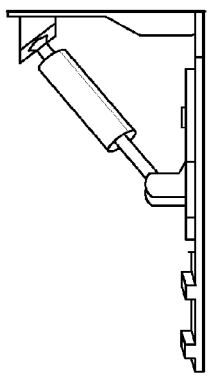
FIG. 18C illustrates a side view of the folding type 2-DOF trim-deflector of FIG. 12I, in the flat retracted position.
Figure 18F:
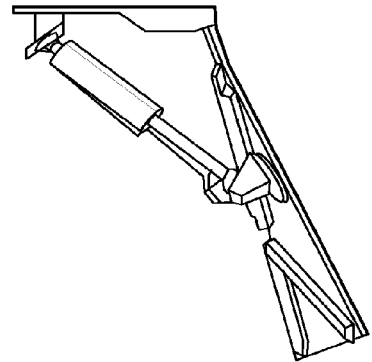
FIGS. 18E-F illustrates side views of the folding type 2-DOF trim-deflector of FIG. 12I, deployed in the exemplary configuration.
Figure 18B:
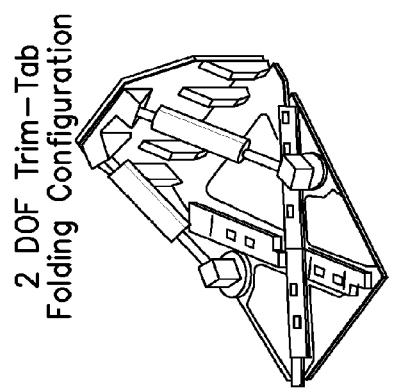
FIG. 18B illustrates a perspective view of the folding type 2-DOF trim-deflector of FIG. 12I, in the flat retracted position.
Figure 18E:
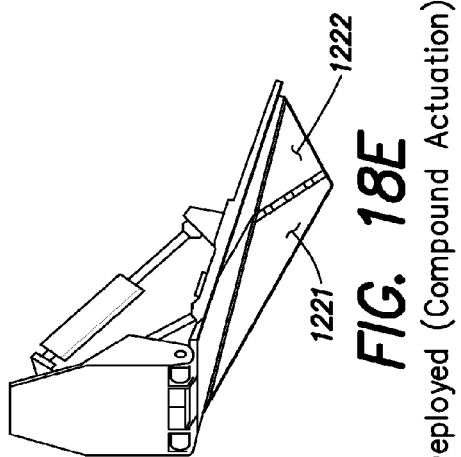
Figure 18A:
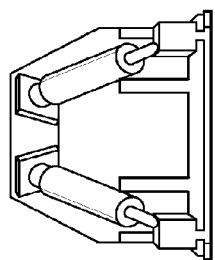
FIG. 18A illustrates a rear view of the folding type 2-DOF trim-deflector of FIG. 12I, in the flat retracted (level with hull bottom) position.
Figure 18D:
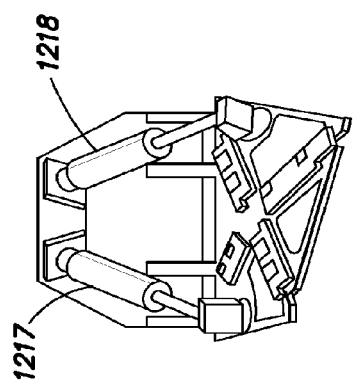
FIG. 18D illustrates a rear view of the folding type 2-DOF trim-deflector of FIG. 12I, deployed in one exemplary configuration.

Referring to FIGS. 18A, 18B and 18C, there are illustrated different views of the folding type 2-DOF trim-deflector of FIG. 12I, in the flat retracted (level with hull bottom) position. Referring to FIGS. 18D, 18E and 18F, there are illustrated different views of the same 2-DOF trim-tab deployed with in one exemplary configuration by a compound actuation with actuators 1217, 1218, where actuator 1217 is extended to an intermediate position and actuator 1218 is extended further than actuator 1217 such that all deflector surfaces of the trim deflector are rotated downward and surfaces 1221 and 1222 of the deflector are further deflected in the down position.

Figure 1:
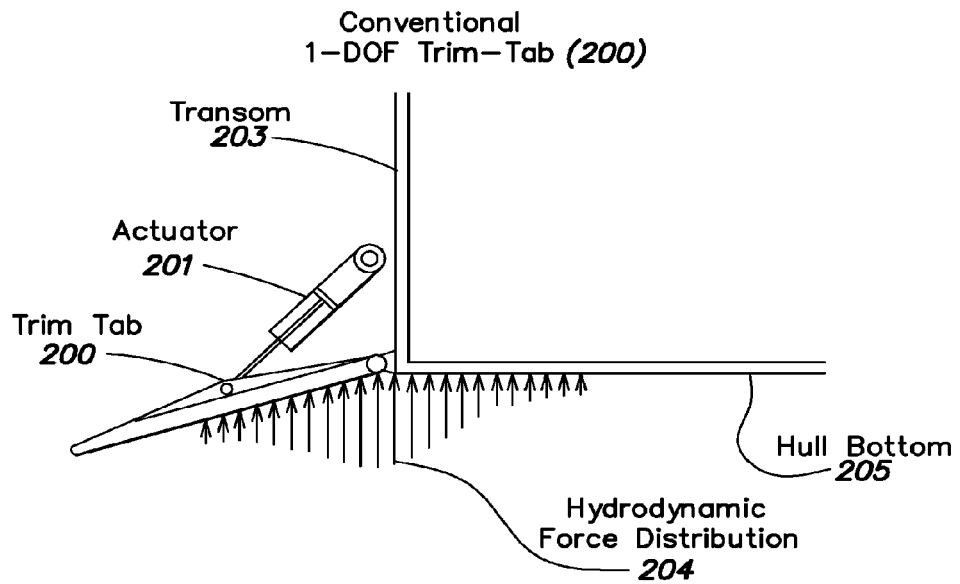
FIG. 1 illustrates a conventional single degree of freedom trim-tab.
Figure 2:
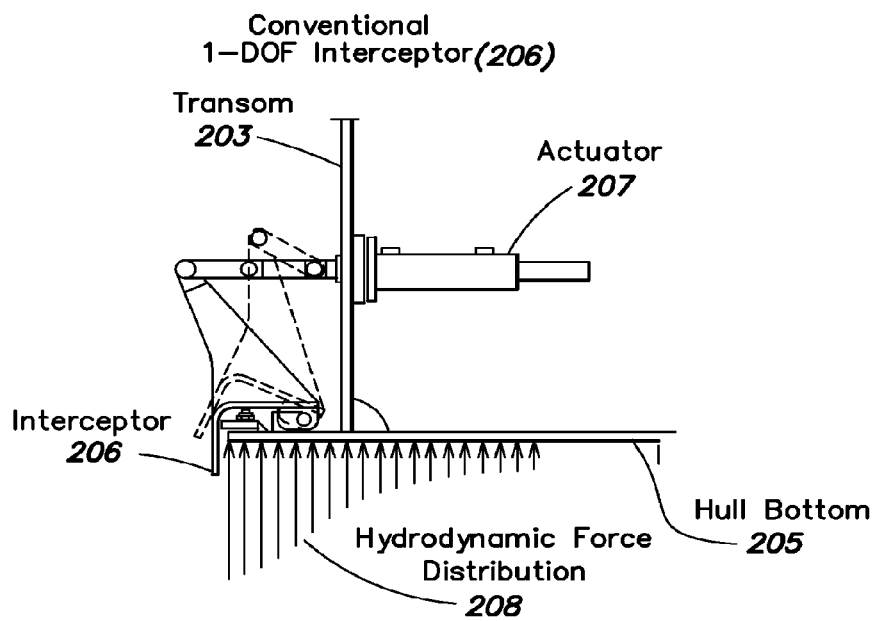
FIG. 2 illustrates a conventional single degree of freedom interceptor.
Figure 3A:
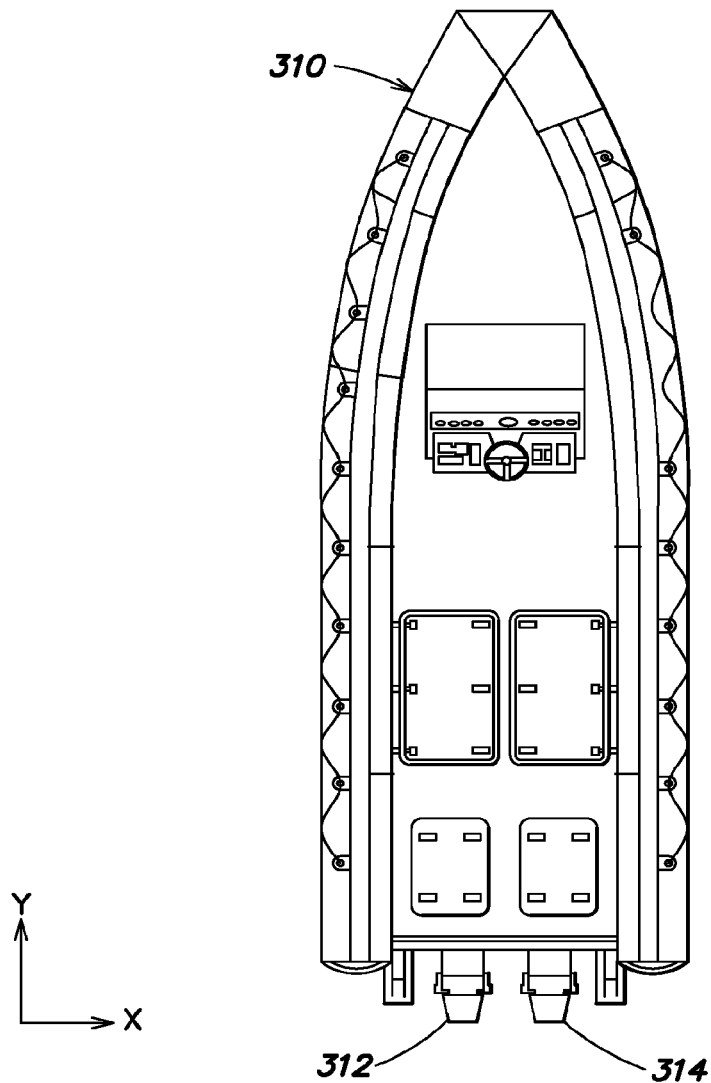
FIG. 3A illustrates a top view of a marine vessel having conventional steering nozzles and the trim-tabs of FIG. 1.
Figure 3B:
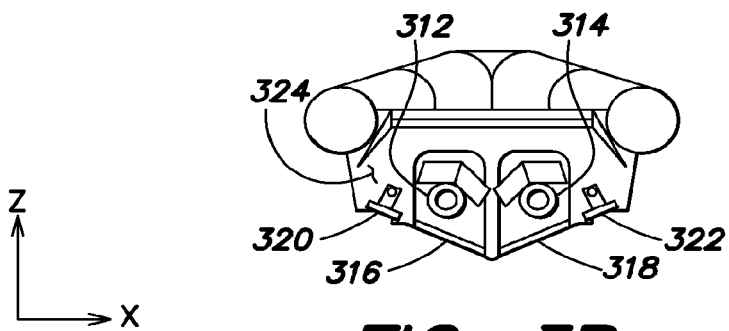
FIG. 3B illustrates a rear view of the marine vessel of FIG. 3A.
Figure 19:
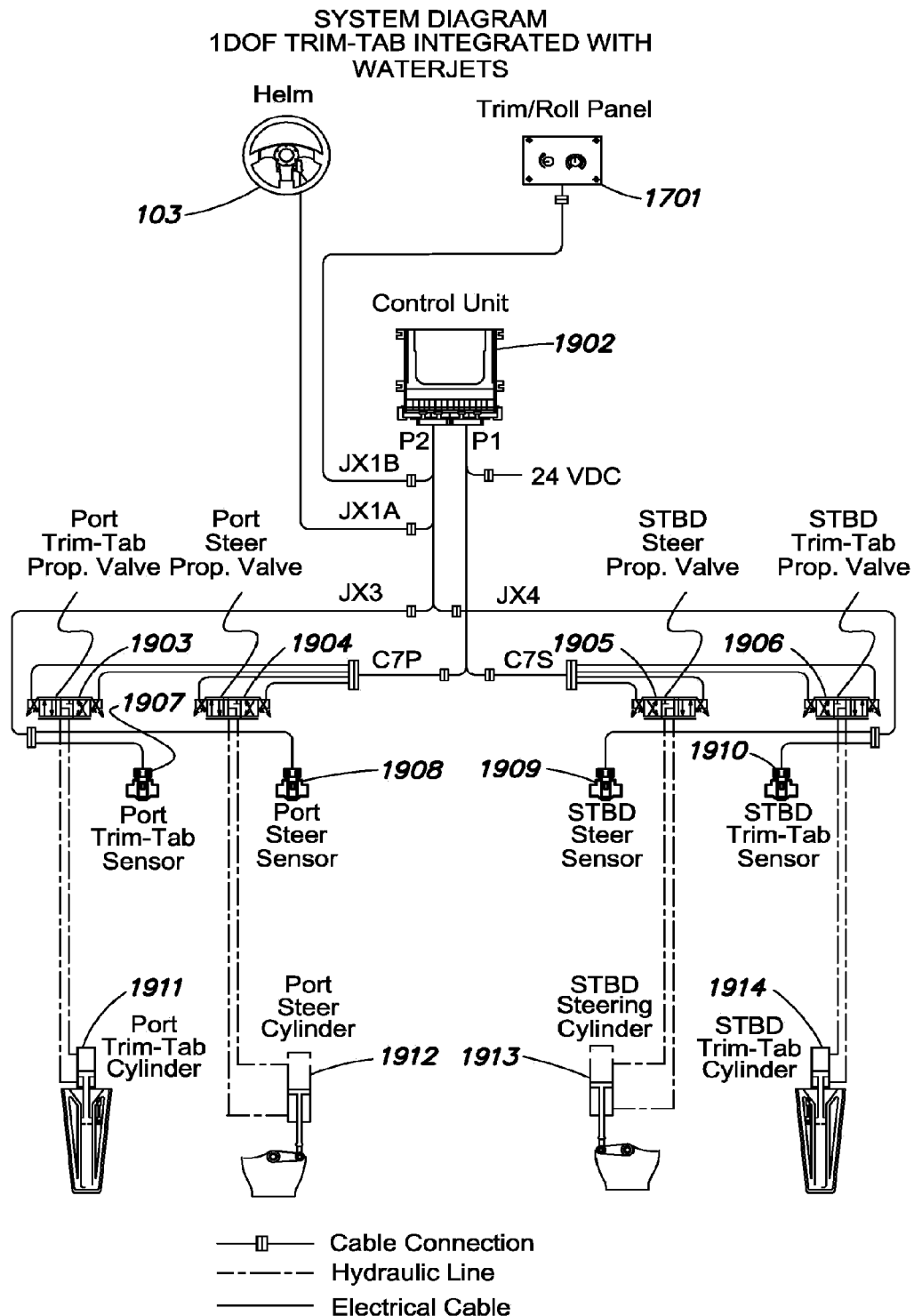
FIG. 19 illustrates a system diagram of control components for controlling the system shown in FIG. 3 of the related art.

Referring to FIG. 19, so as to provide context as to the related art, a system diagram depicts the necessary control components for controlling the trim-tab/waterjet system shown in FIG. 3 of the related art, and the interceptor/waterjet system illustrated in FIGS. 4A and 4B. The helm unit 1901 (or tiller) and Trim/Roll panel 1701 (or trim/roll controller 1700) provide inputs to the Control Unit 1902. The control unit receives these inputs, inputs to sense the position of the trim-tab actuators 1911 and 1914 via feedback sensors 1907 and 1910, and inputs from steering nozzle actuators 1912 and 1913 via feedback sensors 1908 and 1909. The control unit 1902 provides corresponding outputs to control trim-tab actuators 1911 and 1914 by modulating electro-hydraulic proportional valves 1903 and 1906 respectively. Similarly control unit 1902 provides corresponding outputs to control steering nozzle actuators 1912 and 1913 by modulating proportional valves 1904 and 1905.

Figure 20:
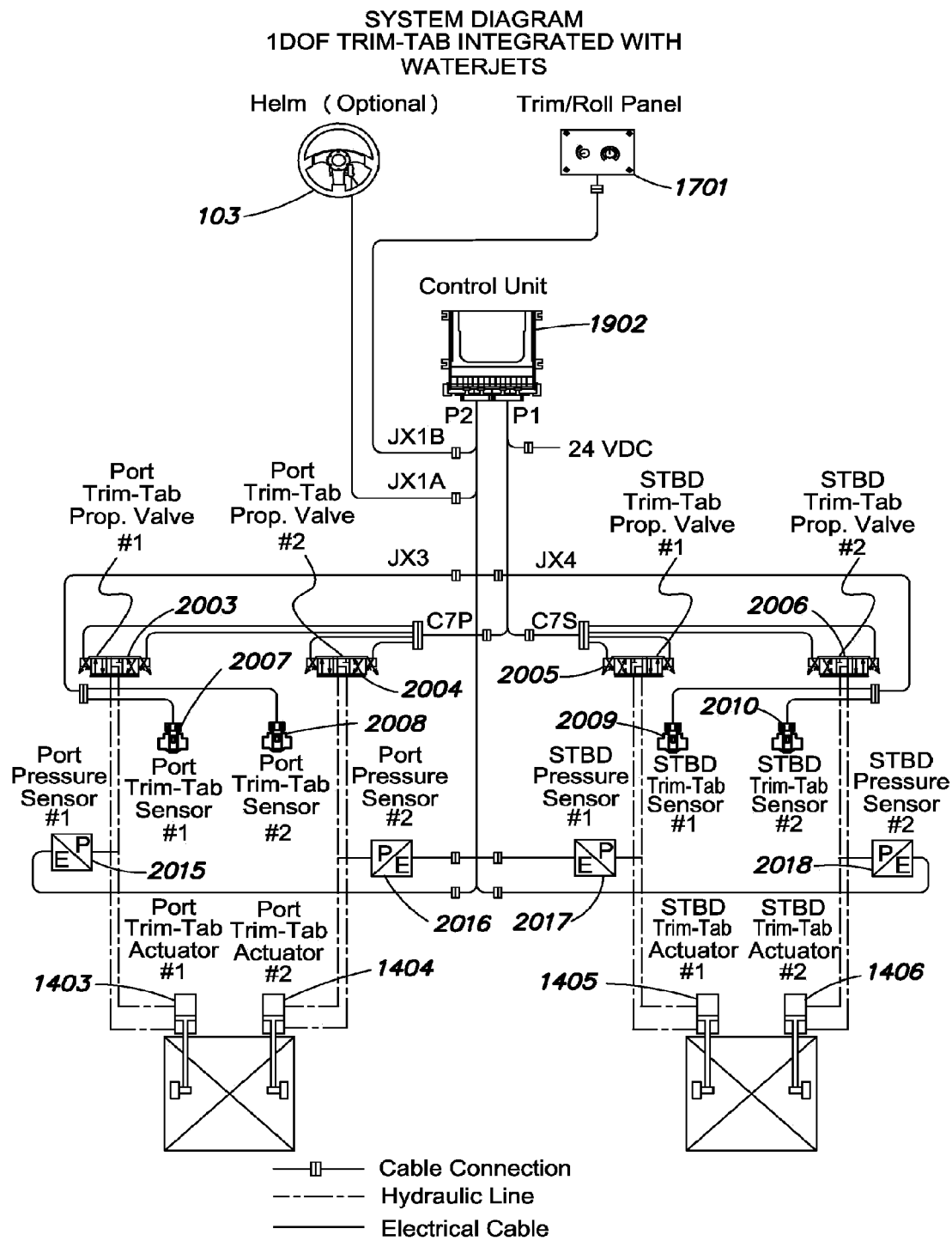
FIG. 20 illustrates control components for controlling the folding 2 DOF trim-tab device as illustrated in FIG. 12I and the system as illustrated in FIGS. 14 and 16.

Referring to FIG. 20, a system diagram illustrates control components according to embodiments of this disclosure for controlling the folding 2 DOF trim-tab device as illustrated, for example, in FIGS. 12I-12M and system as illustrated in FIGS. 14 and 16. The helm unit 1901 (or tiller) and Trim/Roll panel 1701 (or trim/roll controller 1700) provide inputs to the Control Unit 1902 that correspond to their respective positions. The control unit receives the inputs from helm unit 103 (or tiller) and Trim/Roll panel 1701, inputs to sense the position of the port trim-tab actuators 1403 and 1404 via feedback sensors 2007 and 2008, and inputs to sense the position of the starboard trim tab actuators 1405 and 1406 via feedback sensors 2009 and 2010. The control unit 1902 is configured as described herein to control the port trim-tab actuators 1403 and 1404 in response to receipt of these inputs by modulating electro-hydraulic proportional valves 2003 and 2004 respectively. Similarly control unit 1902 is configured as described herein to control the starboard trim-tab actuators 1405 and 1406 in response to receipt of these inputs by modulating proportional valves 2005 and 2006.

Additionally, according to aspects of this the devices and systems of this disclosure, it may be advantageous to estimate the magnitude and direction of the forces created by the trim-deflectors to sense the actual forces provided by the actuators. One way to accomplish this is to install pressure sensors in the actuator hydraulic lines. In this case, the forces developed by actuators 1403 & 1404 are sensed by pressure transducers 2015 and 2016 respectively and the pressure (or force) information is sent to the control unit. Similarly, the forces developed by actuators 1405 and 1406 are sensed by pressure transducers 2017 & 2018 and the pressure (or force) information is also sent to the control unit for processing. FIG. 20 only shows pressure transducers installed in the hydraulic lines that correspond to the down position of the actuators because that is the direction where the majority of the forces will be developed. It is also possible and an aspect of embodiments of this disclosure to install pressure transducers in both hydraulic lines to each actuator. According to other embodiments, an alternative to installing pressure transducers in the hydraulic lines is to use load cells with an electrical output that corresponds to mechanical pressure. According to other embodiments, if electromechanical actuators are used, the force feedback can be determined by sensing the current required to position the actuators, or in the case of piezoelectrics devices, the voltage required to maintain position could be used. The general idea is to use force feedback (by sensing pressure, current, voltage, etc.) to assist in determining the force magnitude and direction applied by the trim-tab in real time.

According to another embodiment of the devices and system of this disclosure, the system that is used to control the articulating trim-deflector as illustrated in FIGS. 12D-12H, and provide the systems as shown in FIGS. 13 and 15, would be similar to the system described in FIG. 20, except that the folding type of trim-deflectors 1401 and 1402 would be replaced with the articulating type of trim-deflectors 1301 and 1302 and actuators 1403, 1404, 1405 & 1406 will be replaced with actuators 1303, 1304, 1305 & 1306. It is to be understood that controller 1902 can be configured to control articulating trim-deflectors 1201 and corresponding actuators 1303-1306, by implementing software in control unit 1902 to accomplish the controller functions disclosed herein.

The feedback sensors 2007, 2008, 2009 and 2010 provide the control unit 1902 with position information of each trim-tab and its individual surfaces. For any of the embodiments disclosed herein, this can be accomplished for the articulating trim-tab 1201 or the folding trim-tab 1202 disclosed herein, by mounting the sensors (e.g., linear potentiometers) internal to the actuators so that the control unit is sensing the actuator position, or the sensors can be mounted directly to the trim-tab (e.g. rotary sensors mounted to the hinges or pivot points) so the control unit is sensing actuator surface positions. A wide variety of displacement sensors can be used such as, for example, potentiometers, Hall Effect and magnetostrictive sensors. For any of the embodiments disclosed herein, it is also possible to mount more than two sensors per trim-tab.

Figure 24:
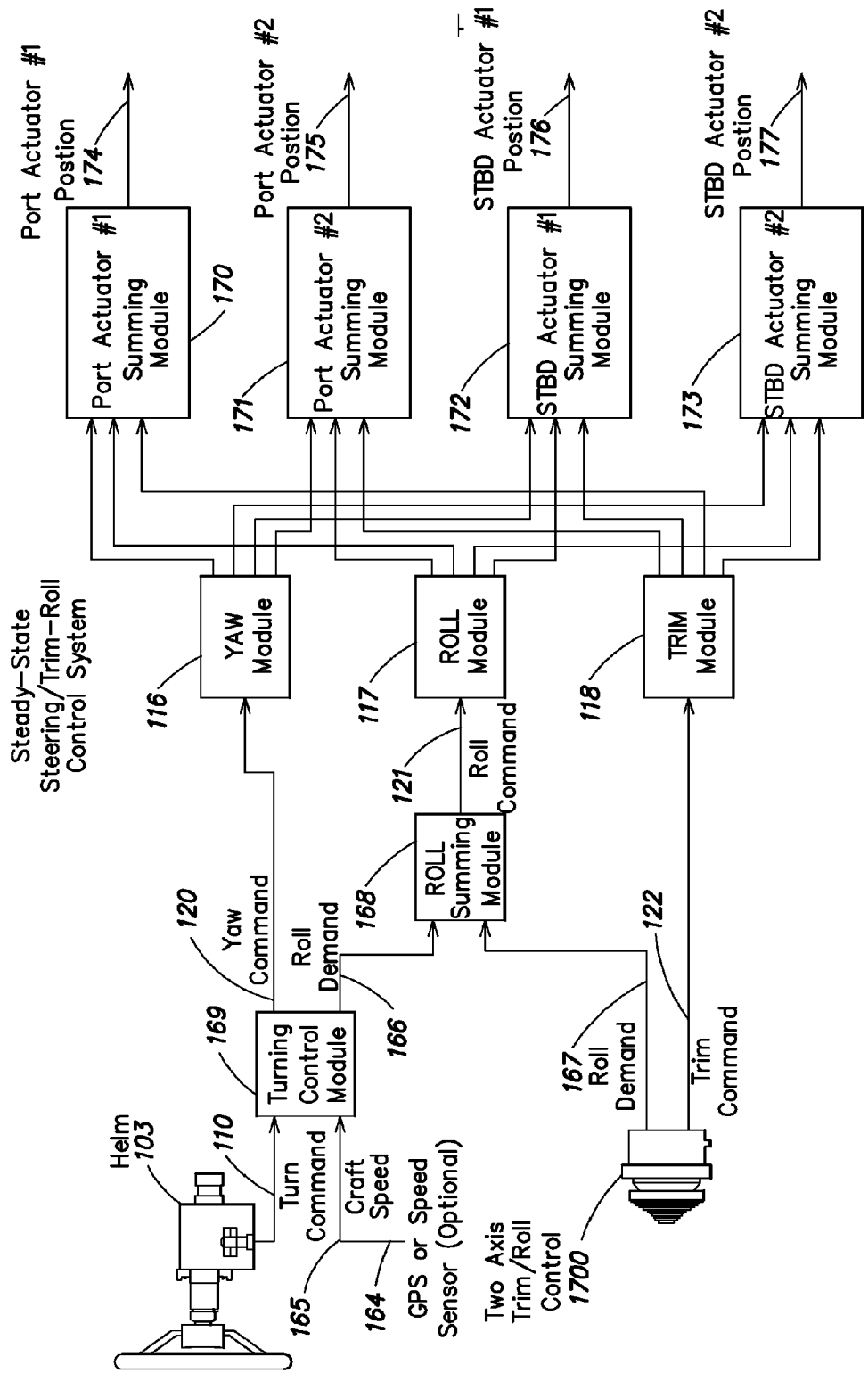
FIG. 24 illustrates one embodiment of a steady state control system that can be used with the devices and systems disclosed herein.

Similar to the trim/roll controls, yaw forces can be commanded using a separate device such as a helm 103 (See FIGS. 19, 20 and 24) or a tiller (single transverse axis steering stick used in place of a helm) in combination with any of the embodiments of the configured controller 1902 disclosed herein. In most cases, turning of the helm will correspond to commanded yawing forces. However, in many high speed craft, it is desirable to also induce a rolling moment while turning. Some problems with high-speed craft that do not roll properly in a high-speed turn are, for example, slipping in the water and spinning-out. Also a craft that is dynamically unstable may roll outboard in a turn if there is too little induced roll or lose sight of the horizon in a turn if there is too much induced roll. It is appreciated that an optimum amount of rolling moment while turning to be commanded by the controller depends on several factors such as hull shape, weight distribution, desired turning radius and speed of the vessel. Too much or too little roll may make the craft difficult to control in a turn or uncomfortable for the passengers. Accordingly, in many cases, it is advantages according to one aspect of this disclosure to calculate and induce a certain amount of roll in a turn using a configured turning control module 169, as illustrated in FIG. 24.

It is appreciated according to some embodiments, that due to the adverse effect of backpressure on the water flow through a waterjet, it is considerably more efficient to develop steering forces for small steering corrections of a vessel using trim deflectors or interceptors in lieu of waterjet nozzles. For example, it is appreciated according to some embodiments of the invention that when making small corrections such as those desired to maintain a steady course or to counter wind disturbances, a sufficient amount of yawing force can be developed with the trim-deflectors. Some advantages of this embodiment are that considerable increases in overall speed or decreases in fuel consumption can be realized when operating this way. The system and devices described herein have a further advantage over the system described in U.S. Pat. No. 7,641,525 B2 because 2-DOF trim-deflectors such as 1201 and 1202 (FIGS. 12D & 12I) can be deployed while inducing no or negligible yaw forces whereas the single DOF trim-deflectors described in U.S. Pat. No. 7,641,525 B2 produce varying amounts of roll and may require actuation of the steering nozzles to cancel the undesired roll. If the waterjet positioning is not favorable in the system of U.S. Pat. No. 7,641,525 B2 it is also possible that the undesired roll cannot be canceled out even with the use of the steering nozzles.

Referring now to FIG. 21A, there is illustrated one embodiment of a yaw controller 116A, based on the folding 2-DOF trim tab 1202 shown in FIG. 12I, according to the invention, which receives a yaw command 120 from the Helm 103. The yaw command 120 is fed as an input signal to four separate function modules, one for each trim tab actuator depicted in FIG. 20. Function modules 124A, 125A, 126A and 127A shown in FIG. 21A compute the appropriate position commands for actuators 1403, 1404, 1405 and 1406, respectively. Taking the example maneuver shown in FIGS. 14B and 16B, a yaw command to port will cause actuators 1404 and 1406 to extend outward (relative to the fully-retracted position), thereby causing the inboard surfaces of the Port trim tab and the outboard surfaces of the Starboard trim tab to deflect downward, respectively. The Port actuator #2 displacement module 125A will develop an output signal 129A that directs the inboard surfaces 1220 and 1221 of the Port trim tab in the downward direction relative to surfaces 1219 and 1222, while the Starboard actuator #2 displacement module 127A will develop an output signal 131A that directs the outboard surfaces 1220 and 1221 of the Starboard trim tab in the downward direction relative to surfaces 1219 and 1222. It is to be appreciated that the movements of trim tabs as illustrated in FIGS. 14B and 16B are by way of example only to illustrate how the trim tab surfaces can be directed by these control modules to move in combination to affect a net yaw force with little or no rolling forces.

Referring now to FIG. 21B, there is illustrated one embodiment of a yaw controller 116B, based on the articulating 2-DOF trim tab 1201 shown in FIG. 12D, According to the invention, which receives a yaw command 120 from the Helm 103. The yaw command 120 is fed as an input signal to four separate function modules, one for each trim tab actuator. Function modules 124B, 125B, 126B and 127B shown in FIG. 21B compute the appropriate position commands for actuators 1304, 1303, 1306 and 1305, respectively. Taking the example maneuver shown in FIGS. 13B and 15B, a yaw command to port will cause the Port trim tab actuators 1303 and 1304 to move; specifically, actuator 1303 will retract relative to its central position, thereby causing the water flow to deflect outboard and upward, resulting in a force directed inboard and downward. While the inboard-directed force produces the desired yaw to port, the downward force is substantially cancelled by the upward force produced as a result of actuator 1304 being extended so as to direct surface 1212 downward. The Port actuator #1 displacement module 124B will develop an output signal 128B that causes movement of actuator 1304, producing downward movement of surface 1212 of the Port trim tab. The Port actuator #2 displacement module 125B will develop an output signal 129B that causes movement of actuator 1303, producing rotation of surfaces 1213 and 1216 of the Port trim tab. accordingly. It is to be appreciated that the movements of steering nozzles and trim tabs as illustrated in FIGS. 13B and 15B are by way of example only to illustrate how the trim tab surfaces can be directed by these control modules to move in combination to affect a net yaw force with little or no rolling forces.

Figure 16C:
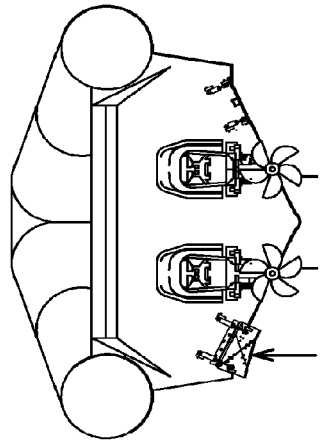
FIG. 16C illustrates a rear view of a marine vessel with outdrives and the trim-deflectors of FIG. 12I, with the port trim deflector positioned to induce a roll moment without inducing a significant yawing force on the marine vessel.

Referring now to FIG. 22A, there is illustrated one embodiment of a roll controller 117A, based on the folding 2-DOF trim tab 1202 shown in FIG. 12I, according to the invention. Controller 117A receives a roll command 121 from the Trim/Roll controller 1700, and in turn the roll command 121 is fed as an input signal to four separate function modules, one for each trim tab actuator depicted in FIG. 20. Function modules 132A, 133A, 134A and 135A shown in FIG. 22A compute the appropriate position commands for actuators 1403, 1404, 1405 and 1406, respectively. Taking by way of example, the maneuver shown in FIGS. 14C and 16C, a roll command to starboard (clockwise looking forward) will correspond to the Port trim-tab deflecting the outboard surfaces 1219 and 1222 downward and pivoting all four surfaces about hinge 1223. This will be accomplished by port actuator displacement module 133A moving the port inboard actuator 1404 in the out direction and by port actuator displacement module 132A moving the port outboard actuator 1403A in the out direction at a higher rate than that of actuator 1404. In addition, the starboard actuator displacement module 134A causes actuator 1405 to move the inboard surfaces 1219 and 1222 of the starboard trim tab downward, thereby creating a force to counteract the yaw-inducing force generated by the port trim tab. It is to be appreciated that the movements of trim-tab actuators as illustrated in FIGS. 14C and 16C and as directed by the function modules of FIG. 22A are by way of example only to illustrate how the trim-tab surfaces can be moved in combination to effect a net rolling force on the vessel 310 with little or substantially no yawing forces, and that other forces such as a rolling force on the vessel in counter clockwise direction with little or substantially no yawing can also be created by the appropriate actuation of the trim tab surfaces. It is also to be appreciated that the roll command 121 can originate from a roll control device (examples are 1700 or 1701) only and not include a component from the helm such as what might be implemented in a ride control system that is completely independent of the steering system. In the system described in FIG. 24, the control logic would be similar except that yaw command would be zero corresponding to no yaw command (induced by the trim-tabs) and roll module 117A will receive an input from only the trim/roll control device (1700 or 1701). Similarly, if the ride control system described in FIG. 25 did not include helm inputs, roll command signal 121 would come directly from the trim/roll control device (1700 or 1701) and the yaw command signal 120 would correspond to no net yaw induced to the craft by the trim-tabs.

Figure 22B:
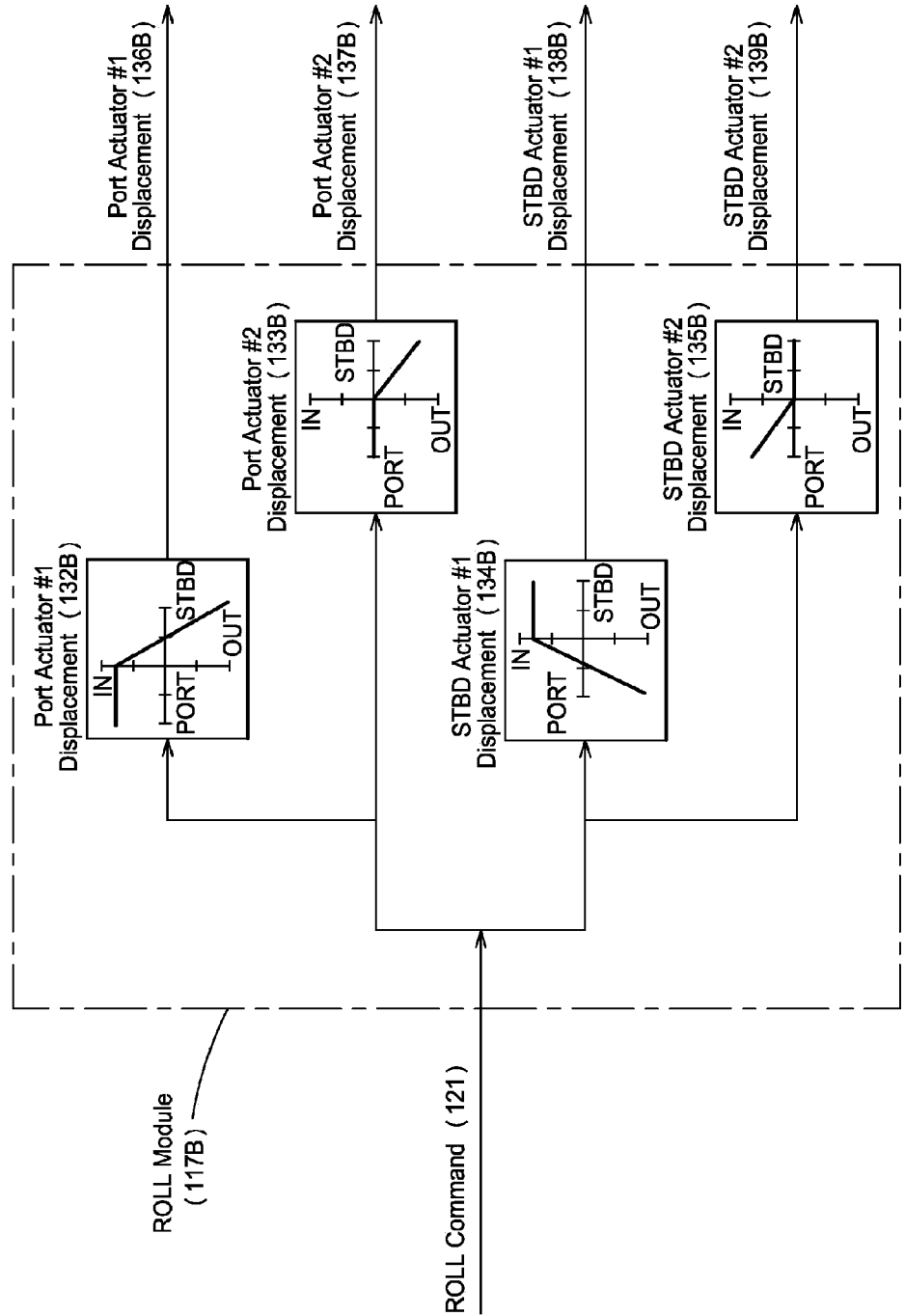
FIG. 22B illustrates one embodiment of a decoupled roll controller for use with the articulating trim deflector.

Referring now to FIG. 22B, there is illustrated one embodiment of a roll controller 117B, based on the articulating 2-DOF trim tab 1201 shown in FIG. 12D, according to the invention. Controller 117B receives a roll command 121 from the Trim/Roll controller 1700, and in turn the roll command 121 is fed as an input signal to four separate function modules, one for each trim tab actuator depicted in FIG. 20. Function modules 132B, 133B, 134B and 135B shown in FIG. 22B compute the appropriate position commands for actuators 1304, 1303, 1306 and 1305, respectively. Taking by way of example, the maneuver shown in FIGS. 13C and 15C, a roll command to starboard (clockwise looking forward) will correspond to the Port trim-tab actuators 1303 and 1304 to move; specifically, actuator 1304 will extend so as to direct surface 1212 downward, resulting in a force directed upward and inboard. While the upward-directed force produces the desired clockwise roll moment, the inboard force is substantially cancelled by the outboard force generated as a result of actuator 1303 being extended so as to cause rotation of surfaces 1213 and 1216 of the Port trim tab to produce an inboard and downward deflection of the water flow. The movements of actuators 1303 and 1304 are controlled by actuator displacement modules 132B and 133B, respectively. It is to be appreciated that the movements of trim-tab actuators as illustrated in FIGS. 13C and 15C and as directed by the function modules of FIG. 22B are by way of example only to illustrate how the trim-tab surfaces can be moved in combination to effect a net rolling force on the vessel 310 with little or substantially no yawing forces, and that other forces such as a rolling force on the vessel in counter clockwise direction with little or substantially no yawing can also be created by the appropriate actuation of the trim tab surfaces. It is also to be appreciated that the roll command 121 can originate from a roll control device (examples are 1700 or 1701) only and not include a component from the helm such as what might be implemented in a ride control system that is completely independent of the steering system. In the system described in FIG. 24, the control logic would be similar except that yaw command would be zero corresponding to no yaw command (induced by the trim-tabs) and roll module 117B will receive an input from only the trim/roll control device (1700 or 1701). Similarly, if the ride control system described in FIG. 25 did not include helm inputs, roll command signal 121 would come directly from the trim/roll control device (1700 or 1701) and the yaw command signal 120 would correspond to no net yaw induced to the craft by the trim-tabs.

Referring now to FIG. 23A, there is illustrated one embodiment of a trim control module 118A, based on the folding 2-DOF trim tab 1202 shown in FIG. 12I, according to the invention. Controller 118A receives a trim command 122 and in turn the trim command 122 is fed as an input signal to four separate function modules, one for each trim tab actuator depicted in FIG. 20. Function modules 140A, 141A, 142A and 143A shown in FIG. 23A compute the appropriate position commands for actuators 1403, 1404, 1405 and 1406, respectively. A bow-down maneuver will correspond to port actuator #1 command signal 144A, port actuator #2 command signal 145A, starboard actuator #1 command signal 146A and starboard actuator #2 command signal 147A all moved outward approximately the same amount, creating a net upward force at the transom.

Figure 23B:
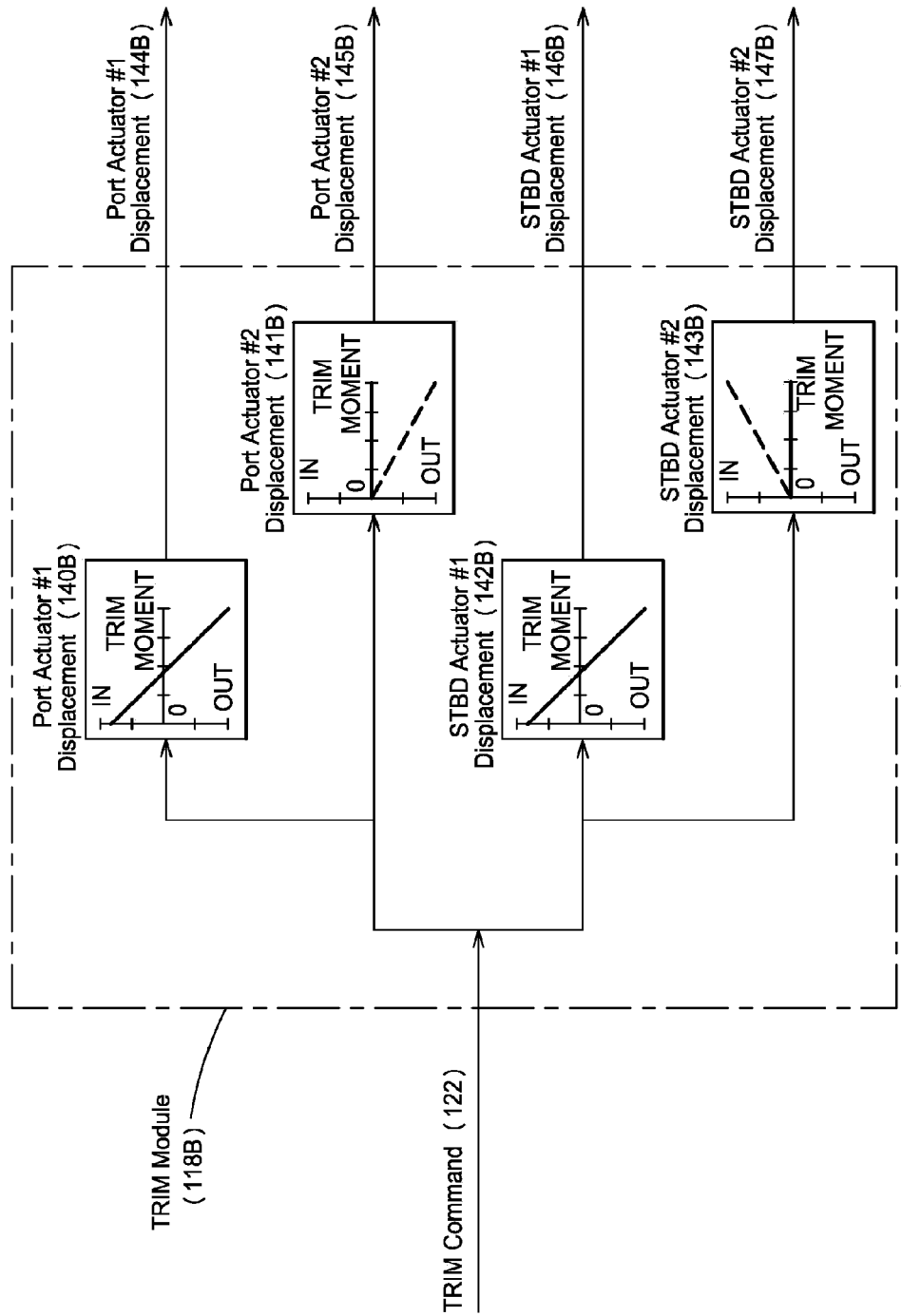
FIG. 23B illustrates one embodiment of a decoupled trim controller for use with the articulating trim deflector.

Referring now to FIG. 23B, there is illustrated one embodiment of a trim control module 118B, based on the articulating 2-DOF trim tab 1201 shown in FIG. 12D, according to the invention. Controller 118B receives a trim command 122 and in turn the trim command 122 is fed as an input signal to four separate function modules, one for each trim tab actuator. Function modules 140B, 141B, 142B and 143B shown in FIG. 23B compute the appropriate position commands for actuators 1304, 1303, 1306 and 1305, respectively. A bow-down maneuver is achieved by extending actuators 1304 and 1306 by approximately the same amount, which corresponds to port actuator #1 command signal 144B and starboard actuator #1 command signal 146B. If desired, the magnitude of the trim moment can be increased by splaying the U-shaped trim-tab components inward, which is accomplished by extending actuator 1303 (port unit) and retracting actuator 1305 (starboard unit); this option corresponds to the dashed lines shown for displacement modules 141B and 143B shown in FIG. 23B.

Referring now to FIG. 24, there is illustrated one embodiment of a steady state control system that can be used with the devices and systems disclosed herein. The control system integrates the three decoupled force control modules discussed above with respect to FIGS. 21-23, such that one set of control apparatus (e.g., helm controller 103 & trim/roll controller 1700) will allow the craft operator to independently command one, two or all three of the decoupled forces (trim, roll, yaw) on the vessel, without the individual forces significantly effecting each other. For the embodiment of the control system as shown in FIG. 24, trim, roll and yaw forces are applied to the craft and are controlled by the helm controller (steering wheel) 103 and two-axis trim/roll controller 1700 (or 1701). A helm turn command signal 110 provided by the helm controller (steering wheel) 103 typically relates to course corrections or turning the craft that is desired. It is appreciated that according to any of the embodiments of the trim deflector devices and control system disclosed herein, it is also desirable to apply a rolling force to the vessel when implementing a turning maneuver, as it is easier and safer to execute a turn if the craft is rolling in the direction of the turn (e.g., roll to port when turning to port). It is appreciated that the amount of rolling force that should be provided to the vessel depends on factors such as hull shape, weight distribution (vertical center of gravity {VCG}), desired turning radius and vessel speed. According to some embodiments of the control system of the system as illustrated in FIG. 24, it is advantageous to provide a control module 169 that is configured to determine an amount of yaw and roll forces to be provided to the vessel in a turn.

It may also be desirable to use the output signal of the helm to control steering devices such as steering nozzles, rudders and steering angle of the propeller in addition to and in combination with the trim-deflectors. These devices can be controlled by additional actuator output signals of the system described herein or by a separate system that uses a command signal from the same helm unit.

Figure 25A:
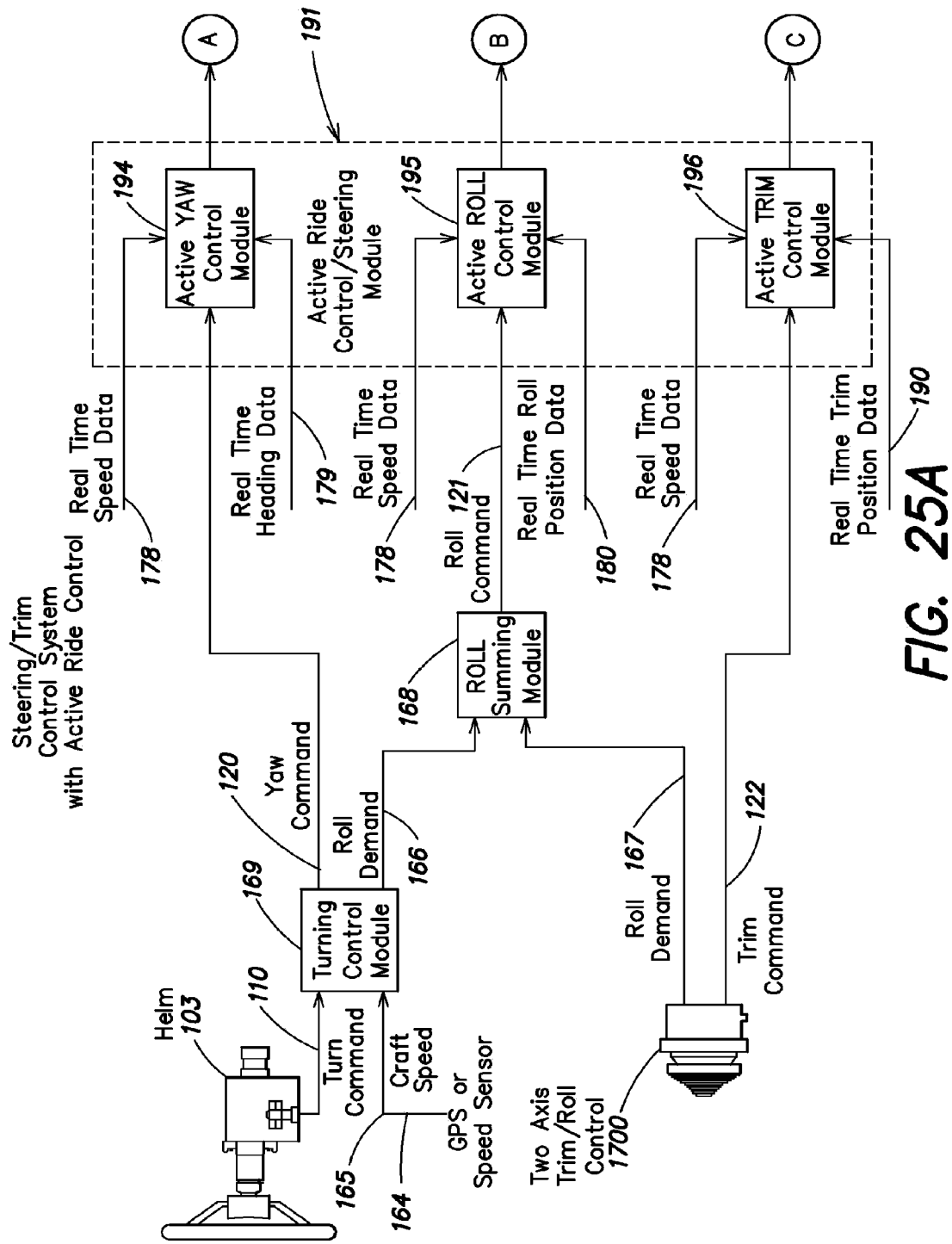
FIGS. 25A and 25B illustrate one embodiment of a control system with active control that can be used with the devices and systems disclosed herein.
Figure 25B:
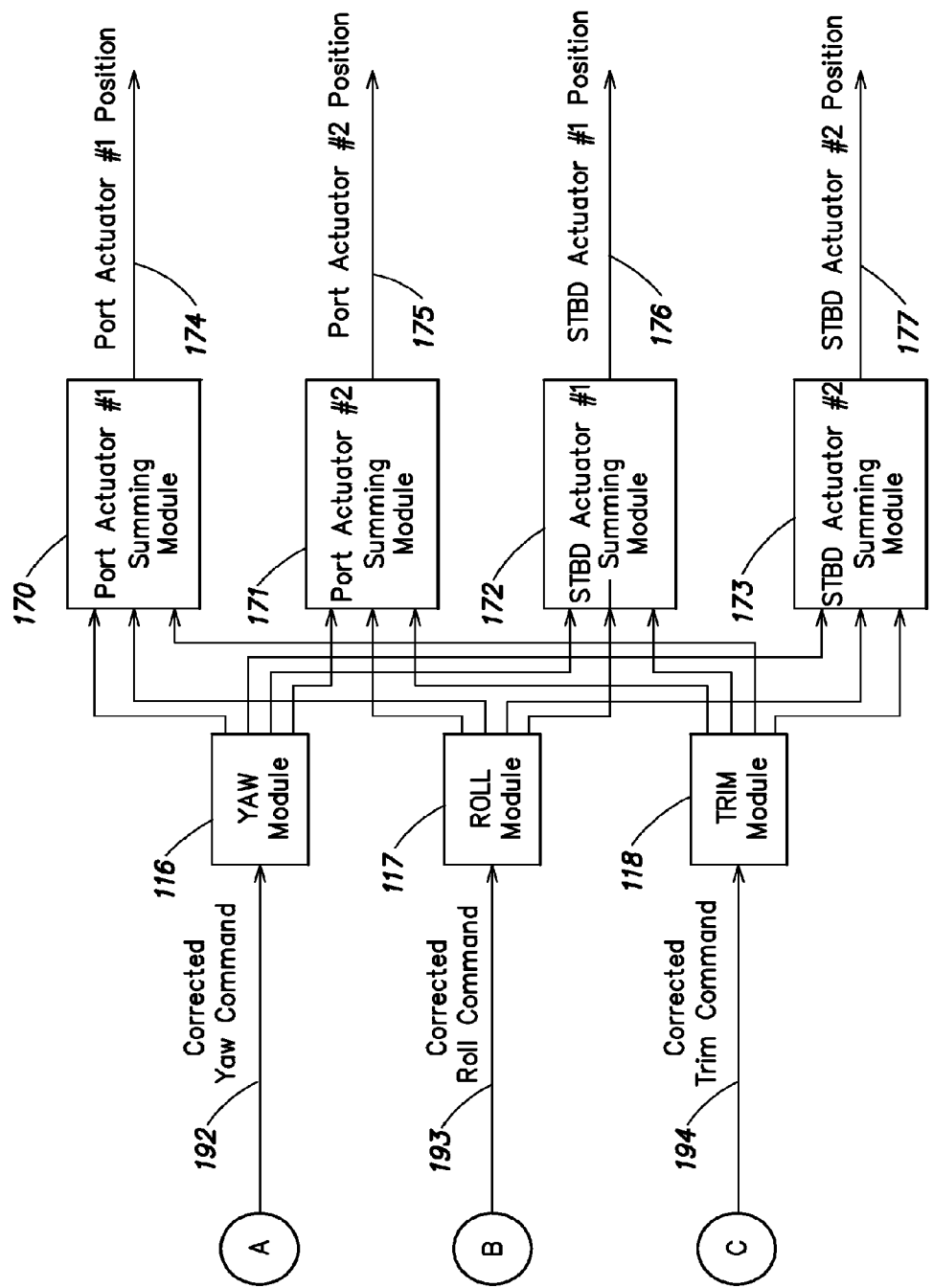

Referring now to FIG. 25, there is illustrated another embodiment of a control system to be used with any of the embodiments of the devices and systems disclosed herein. This embodiment of the control system also includes an active ride control system 191, which provides for actual craft motion to be sensed and the yaw command signal 120, roll command signal 121, and trim command signal 122, as to be modified in real time in response to the actual craft motion. It is to be appreciated that the embodiment of the control system illustrated in FIG. 25 comprises the same decoupled force modules 116, 117, 118 and summing modules 168, 170, 171, 172, 173 as the system illustrated in FIG. 24, and that for the sake of brevity the description of these modules will not be repeated. One additional feature that is provided by the control system of FIG. 25, however, is that the active force control modules 194, 195, 196 receive real-time speed and position data from devices on the craft and adjust (correct) the yaw 120, roll 121, and trim 122 command signals to compensate for differences between the actual craft response and the commanded (desired) craft response.

Another advantage of the control system of FIG. 25 is that the ride control module device 191 will effectively respond to and compensate for outside disturbances such as wind and waves that will affect the craft motion. For example, it is illustrative to compare the operation of the control system of FIG. 24, without the active ride control module, to the control system of FIG. 25 with the active ride control module. By way of example, let's take the roll command signal 121, which may correspond to a zero roll force value (i.e., there is no roll force requirement to achieve the desired craft orientation). If the craft were to roll to port in response to an influence external to the control system such as a wave or wind gust, the embodiment of the control system illustrated in FIG. 24 would need the operator of the system to push the trim/roll controller 1700 in the starboard direction (or rotate roll knob 1703 clockwise) to compensate for the external disturbance force, if it is to be compensated for, which would result in the control system issuing the position control signal to move the port trim tab 1401 downward while bending the two outer surfaces 1219 & 1222 further downward. In contrast, the system illustrated in FIG. 25, will sense the roll movement of the vessel, for example, via a roll or incline sensor and forward the roll position signal 180 to the active roll control module 195. The active roll control module 195 will then modify the roll command signal 121 to include a starboard roll force to counter the port craft roll due to the external wind/wave disturbance and forward the corrected roll command signal 193 to the decoupled roll module 117. It is to be appreciated that the operation of the system of FIG. 25 has been described by way of example to an external rolling force operating on the vessel, which is corrected by the system and the system will work similarly to provide yaw and trim corrections for external yaw and trimming forces induced to the vessel.

It should be appreciated that the concept described herein, in particular, individually controlling multiple surfaces of trim deflectors to induce desired trimming, yawing and rolling forces to a vessel, as well as to mitigate undesired trimming, yawing and rolling forces, can also be used with other types of vessel propulsion systems such as outboard motors, inboard/outboard drives, stern drives, including single and dual-propeller type drives, as well as surface (e.g., Arneson) drives. It is to be appreciated that the shape and curves of each of the control modules are shown by way of example, and that the shape of the curves and locations of key operating points of these various modules as described herein can change based on the specifics of the application, such as, the shape and size of the hull, speed of the vessel, and various other parameters of the application in which the system and method of the invention are to be used.

According to another aspect of the invention, it should be appreciated that the shape of the trim deflectors can be modified, e.g. optimized, to vary and optimize performance of the herein described forces provided to the vessel. Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of acts or system elements, it should be understood that those acts and those elements may be combined in other ways to accomplish the same objectives. Acts, elements and features discussed only in connection with one embodiment are not intended to be excluded from a similar role in other embodiments.

It should also be appreciated that the use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name.

The invention claimed is:

1. A trim deflector for a marine vessel, the trim deflector comprising:
   at least one surface configured to be attached to the marine vessel and controllably moved relative to the marine vessel along at least two degrees of freedom, wherein the at least one surface is configured to generate forces in different directions when the at least one surface is at different positions along the at least two degrees of freedom,
   wherein the at least two degrees of freedom comprises a first degree of freedom and a second degree of freedom, wherein the at least one surface is coupled to a first actuator and a second actuator configured to controllably move the at least one surface relative to the marine vessel along the at least two degrees of freedom, wherein the at least one surface comprises:
  a first surface configured to be controllably moved at least in part by the first actuator along the first degree of freedom; and
  a second surface configured to be controllably moved at least in part by the second actuator along the second degree of freedom, wherein the second surface is movably coupled to the first surface via a first joint, wherein an axis direction of the first joint is at a first diagonal relative to a transverse axis of the marine vessel, wherein the at least one surface further comprises a third surface movably coupled to the first surface via a second joint, wherein an axis direction of the second joint is at a second diagonal relative the transverse axis of the marine vessel, wherein the second diagonal is different from the first diagonal.

* * * * *